United States Patent
Northrop

(10) Patent No.: US 9,829,246 B2
(45) Date of Patent: Nov. 28, 2017

(54) CRYOGENIC SYSTEMS FOR REMOVING ACID GASES FROM A HYDROCARBON GAS STREAM USING CO-CURRENT SEPARATION DEVICES

(75) Inventor: Paul Scott Northrop, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 629 days.

(21) Appl. No.: 13/805,645

(22) PCT Filed: Jun. 28, 2011

(86) PCT No.: PCT/US2011/042203
§ 371 (c)(1),
(2), (4) Date: Dec. 19, 2012

(87) PCT Pub. No.: WO2012/015554
PCT Pub. Date: Feb. 2, 2012

(65) Prior Publication Data
US 2013/0098105 A1    Apr. 25, 2013

Related U.S. Application Data

(60) Provisional application No. 61/369,377, filed on Jul. 30, 2010, provisional application No. 61/500,314, filed on Jun. 23, 2011.

(51) Int. Cl.
*F25J 3/02*    (2006.01)
*C10L 3/10*    (2006.01)

(52) U.S. Cl.
CPC ............ *F25J 3/0266* (2013.01); *C10L 3/102* (2013.01); *C10L 3/106* (2013.01); *F25J 3/02* (2013.01);
(Continued)

(58) Field of Classification Search
CPC ........ F25J 3/0209; F25J 3/0266; F25J 3/0233; F25J 2200/02; F25J 2200/74;
(Continued)

(56) References Cited

U.S. PATENT DOCUMENTS 2,621,216 A    12/1952    White ..................... 260/683.3
2,863,527 A    12/1958    Herbert et al. ............... 183/115
(Continued)

FOREIGN PATENT DOCUMENTS

EP    508244    10/1992    ............ B01D 53/34
EP    1323698    7/2003    ............ C07C 29/38
(Continued)

OTHER PUBLICATIONS

WO2012015554 International Search Report.*
(Continued)

*Primary Examiner* — Frantz Jules
*Assistant Examiner* — Brian King
(74) *Attorney, Agent, or Firm* — ExxonMobil Upstream Research Company—Law Department

(57) ABSTRACT

A system for removing acid gases from a raw gas stream is provided. The system includes a cryogenic distillation column. The cryogenic distillation column receives a dehydrated and chilled sour gas stream, and separates the sour gas stream into an overhead gas stream comprised primarily of methane, and a bottom acid gas stream comprised primarily of carbon dioxide. The system also includes a series of co-current contactors. The co-current contactors may be placed in series to receive the bottom acid gas stream and recapture any entrained methane gas. Alternatively or in addition, the co-current contactors may be placed in series to receive the overhead gas stream, and sweeten it using a reflux liquid such as methane. In this instance, the sweetened (Continued)

gas is optionally liquefied and delivered for commercial sale, or is used as fuel gas on-site.

26 Claims, 3 Drawing Sheets

(52) U.S. Cl.
CPC ............ *F25J 3/0209* (2013.01); *F25J 3/0233* (2013.01); *F25J 2200/02* (2013.01); *F25J 2200/40* (2013.01); *F25J 2200/74* (2013.01); *F25J 2200/76* (2013.01); *F25J 2205/02* (2013.01); *F25J 2205/04* (2013.01); *F25J 2205/20* (2013.01); *F25J 2210/62* (2013.01); *F25J 2210/80* (2013.01); *F25J 2215/04* (2013.01); *F25J 2220/66* (2013.01); *F25J 2220/68* (2013.01); *F25J 2240/60* (2013.01); *F25J 2260/80* (2013.01); *F25J 2270/12* (2013.01); *F25J 2270/60* (2013.01); *F25J 2280/10* (2013.01); *F25J 2280/40* (2013.01); *F25J 2290/42* (2013.01); *Y02C 10/12* (2013.01)

(58) Field of Classification Search
CPC .. F25J 2200/40; F25J 2260/80; F25J 2220/60; C10L 3/104; B01D 53/1462; B01D 53/1475; B01D 2011/005; B01D 2201/086; B01D 2215/028; B01D 2259/40073; B01D 53/526; B01D 53/818
See application file for complete search history.

(56) References Cited

U.S. PATENT DOCUMENTS

| | | | | |
|---|---|---|---|---|
| 3,050,950 | A | 8/1962 | Karwat et al. | 62/13 |
| 3,109,726 | A | 11/1963 | Karwat | 62/13 |
| 3,393,527 | A | 7/1968 | Swensen et al. | 62/16 |
| 3,400,512 | A | 9/1968 | McKay | 55/69 |
| 3,767,766 | A | 10/1973 | Tjoa et al. | 423/220 |
| 3,933,001 | A | 1/1976 | Muska | 62/47 |
| 4,117,079 | A * | 9/1978 | Bellows | B01D 53/864 |
| | | | | 423/219 |
| 4,246,015 | A | 1/1981 | Styring | 62/12 |
| 4,270,937 | A | 6/1981 | Adler | |
| 4,319,964 | A | 3/1982 | Katz et al. | |
| 4,405,585 | A | 9/1983 | Sartori et al. | 423/228 |
| 4,417,449 | A | 11/1983 | Hegarty et al. | 62/28 |
| 4,421,535 | A | 12/1983 | Mehra | 62/17 |
| 4,459,142 | A | 7/1984 | Goddin | 62/17 |
| 4,511,382 | A | 4/1985 | Valencia et al. | 62/20 |
| 4,512,782 | A | 4/1985 | Bauer et al. | 55/48 |
| 4,533,372 | A | 8/1985 | Valencia et al. | 62/12 |
| 4,551,158 | A | 11/1985 | Wagner et al. | 55/46 |
| 4,563,202 | A | 1/1986 | Yao et al. | 62/17 |
| 4,595,404 | A * | 6/1986 | Ozero | F25J 3/0209 |
| | | | | 62/630 |
| 4,602,477 | A | 7/1986 | Lucadamo | 62/24 |
| 4,609,388 | A | 9/1986 | Adler et al. | 62/12 |
| 4,695,672 | A | 9/1987 | Bunting | 585/867 |
| 4,720,294 | A | 1/1988 | Lucadamo et al. | 62/31 |
| 4,762,543 | A | 8/1988 | Pantermuehl et al. | 62/28 |
| 4,831,206 | A | 5/1989 | Zarchy | 585/737 |
| 4,923,493 | A | 5/1990 | Valencia et al. | 62/13 |
| 4,935,043 | A | 6/1990 | Blanc et al. | 62/20 |
| 4,976,849 | A | 12/1990 | Soldati | 208/351 |
| 5,062,270 | A | 11/1991 | Haut et al. | 62/12 |
| 5,120,338 | A | 6/1992 | Potts et al. | 62/12 |
| 5,233,837 | A | 8/1993 | Callahan | 62/38 |
| 5,265,428 | A | 11/1993 | Valencia et al. | 62/36 |
| 5,335,504 | A * | 8/1994 | Durr et al. | 62/632 |
| 5,620,144 | A | 4/1997 | Strock et al. | 239/557 |
| 5,700,311 | A | 12/1997 | Spencer | 95/236 |
| 5,720,929 | A | 2/1998 | Minkkinen et al. | 422/190 |
| 5,819,555 | A | 10/1998 | Engdahl | 62/637 |
| 5,956,971 | A * | 9/1999 | Cole | F25J 1/0202 |
| | | | | 62/623 |
| 5,964,985 | A | 10/1999 | Wootten | 201/40 |
| 5,983,663 | A | 11/1999 | Sterner | 62/620 |
| 6,053,007 | A | 4/2000 | Victory et al. | 62/619 |
| 6,082,133 | A | 7/2000 | Barclay et al. | 62/619 |
| 6,082,373 | A | 7/2000 | Sakurai et al. | 134/1 |
| 6,162,262 | A | 12/2000 | Minkkinen et al. | 23/295 |
| 6,223,557 | B1 | 5/2001 | Cole | 62/613 |
| 6,240,744 | B1 | 6/2001 | Agrawal et al. | 62/643 |
| 6,336,334 | B1 | 1/2002 | Minkkinen et al. | 62/123 |
| 6,374,634 | B2 | 4/2002 | Gallarda et al. | 62/620 |
| 6,401,486 | B1 | 6/2002 | Lee et al. | 62/630 |
| 6,416,729 | B1 | 7/2002 | DeBerry et al. | 423/573.1 |
| 6,442,969 | B1 | 9/2002 | Rojey et al. | 62/618 |
| 6,505,683 | B2 | 1/2003 | Minkkinen et al. | 166/266 |
| 6,516,631 | B1 | 2/2003 | Trebble | |
| 6,517,801 | B2 | 2/2003 | Watson et al. | 423/574.1 |
| 6,539,747 | B2 | 4/2003 | Minta et al. | 62/620 |
| 6,565,629 | B1 | 5/2003 | Hayashida et al. | 95/211 |
| 6,735,979 | B2 | 5/2004 | Lecomte et al. | 62/611 |
| 6,818,194 | B2 | 11/2004 | DeBerry et al. | 423/228 |
| 6,946,017 | B2 | 9/2005 | Leppin et al. | 95/139 |
| 6,958,111 | B2 | 10/2005 | Rust et al. | 202/158 |
| 6,962,061 | B2 | 11/2005 | Wilding et al. | 62/613 |
| 7,001,490 | B2 | 2/2006 | Wostbrock et al. | 203/1 |
| 7,004,985 | B2 | 2/2006 | Wallace et al. | 48/198.3 |
| 7,073,348 | B2 | 7/2006 | Clodic et al. | 62/532 |
| 7,121,115 | B2 | 10/2006 | Lemaire et al. | 62/625 |
| 7,128,276 | B2 | 10/2006 | Nilsen et al. | |
| 7,152,431 | B2 | 12/2006 | Amin et al. | 62/637 |
| 7,211,701 | B2 | 5/2007 | Muller et al. | 568/853 |
| 7,219,512 | B1 | 5/2007 | Wilding et al. | 62/617 |
| 7,325,415 | B2 | 2/2008 | Amin et al. | 62/541 |
| 7,424,808 | B2 | 9/2008 | Mak | 62/625 |
| 7,442,233 | B2 | 10/2008 | Mitariten | 95/123 |
| 7,493,779 | B2 | 2/2009 | Amin | 62/617 |
| 7,550,064 | B2 | 6/2009 | Bassler et al. | 203/29 |
| 7,691,239 | B2 | 4/2010 | Kister et al. | 203/2 |
| 7,722,289 | B2 | 5/2010 | Leone et al. | 405/53 |
| 2002/0174687 | A1 | 11/2002 | Cai | 65/158 |
| 2003/0181772 | A1 | 9/2003 | Meyer et al. | 585/324 |
| 2003/0192343 | A1 | 10/2003 | Wilding et al. | 62/613 |
| 2004/0057886 | A1* | 3/2004 | Paulsen | B01D 53/1493 |
| | | | | 423/220 |
| 2006/0144079 | A1 | 7/2006 | Amin | 62/532 |
| 2006/0179878 | A1 | 8/2006 | Nohlen | 62/617 |
| 2006/0239879 | A1 | 10/2006 | Lallemand et al. | 423/210 |
| 2007/0056317 | A1 | 3/2007 | Amin et al. | 62/532 |
| 2007/0144943 | A1 | 6/2007 | Lemaire et al. | 208/208 |
| 2007/0277674 | A1 | 12/2007 | Hirano et al. | 95/290 |
| 2008/0034789 | A1 | 2/2008 | Fieler et al. | 62/623 |
| 2008/0282884 | A1 | 11/2008 | Kelley et al. | 95/96 |
| 2008/0307827 | A1 | 12/2008 | Hino et al. | 62/634 |
| 2009/0023605 | A1 | 1/2009 | Lebl et al. | 506/27 |
| 2009/0071648 | A1 | 3/2009 | Hagen et al. | 166/272.1 |
| 2009/0220406 | A1 | 9/2009 | Rahman | 423/437.1 |
| 2009/0261017 | A1 | 10/2009 | Iqbal et al. | 208/128 |
| 2009/0299122 | A1* | 12/2009 | Geers | B01D 53/002 |
| | | | | 585/857 |
| 2010/0018248 | A1 | 1/2010 | Fieler | |
| 2010/0024472 | A1 | 2/2010 | Amin et al. | 62/541 |
| 2010/0107687 | A1 | 5/2010 | Andrian et al. | 62/620 |

FOREIGN PATENT DOCUMENTS

| | | | |
|---|---|---|---|
| GB | 2221977 | 2/1990 | ............ F25J 3/02 |
| WO | WO2001/085656 | 11/2001 | ............ C07C 11/167 |
| WO | WO2002/039038 | 5/2002 | ............ F25J 3/06 |
| WO | WO2003/062725 | 7/2003 | ............ F25J 3/08 |
| WO | WO2004/009204 | 1/2004 | ............ B01D 3/32 |
| WO | WO2004/020118 | 3/2004 | ............ B08B 9/00 |
| WO | WO2004/047956 | 6/2004 | ............ B01D 53/14 |
| WO | WO2004/070297 | 8/2004 | ............ F25J 3/06 |
| WO | WO2006/022885 | 3/2006 | ............ B01D 53/14 |
| WO | WO2007/030888 | 3/2007 | ............ F25J 3/08 |
| WO | WO2008/002592 | 1/2008 | |

(56) References Cited

FOREIGN PATENT DOCUMENTS

| WO | WO2008/091316 | 7/2008 | ............... F25J 3/00 |
|----|---------------|--------|---------------------------|
| WO | WO2008/091317 | 7/2008 | ............ F25D 25/00 |
| WO | WO2008/095258 | 8/2008 | ............... F25J 3/02 |
| WO | WO2008/152030 | 12/2008 | ............ B01D 53/00 |
| WO | WO2009/087206 | 7/2009 | ............ B01D 53/00 |
| WO | WO2010/003894 | 1/2010 | ............... F25J 3/06 |
| WO | WO2010/006934 | 1/2010 | ............... F25J 3/02 |
| WO | WO2010/023238 | 3/2010 | ............... F25J 3/06 |
| WO | WO2010/034627 | 4/2010 | ............... F25J 3/06 |
| WO | WO2010/044956 | 4/2010 | |
| WO | WO2010/052299 | 5/2010 | ............ B01D 53/00 |
| WO | WO2010/079175 | 7/2010 | ............... F25J 3/06 |
| WO | WO2010/079177 | 7/2010 | ............... F25J 3/06 |

OTHER PUBLICATIONS

Aaron, D. et al. (2005) "Separation of $CO_2$ from Flue Gas: A Review," *Separation Science and Technology,* 40, pp. 321-348.

Amin, R. (2003) "Advanced Mini Natural Gas Liquefier," *LNG Journal,* Mar.-Apr. 2003, pp. 20-23.

Denton, R. D. et al. (1985) "Integrated Low Temperature Processing of Sour Natural Gas," *Gas Processors Assoc., 64th Ann. Conv.,* pp. 92-96.

Hassan, S. M. N. (2005) "Techno-Economic Study of $CO_2$ Capture Process for Cement Plants," *University of Waterloo—Thesis,* 200 pages.

Haut, R. C. et al. (1988) "Development and Application of the Controlled Freeze Zone Process," *SPE 17757, SPE Gas Tech. Symp.*—Dallas, TX, pp. 435-443.

Haut, R. C. et al. (1988) "Development and Application of the Controlled Freeze Zone Process," *OSEA 88197, 7th Offshore So. East Asia Conf.,* Singapore, Feb. 1988, pp. 840-848.

Haut, R. C. et al. (1989) "Development and Application of the Controlled Freeze Zone Process," *SPE Production Engineering,* Aug. 1989, pp. 265-271.

Mitariten, M. et al. (2007) "The Sorbead™ Quick-Cycle Process for Simultaneous Removal of Water, Heavy Hydrocarbons and Mercaptans from Natural Gas," *Laurance Reid Gas Conditioning Conference,* Feb. 25-27, 2007, 14 pages.

Northrop, P. Scott et al. (2004) "Cryogenic Sour Gas Process Attractive for Acid Gas Injection Applications," *83rd Ann. Gas Processors Assoc. Convention,* New Orleans, LA, 8 pgs.

Pagcatipunan, C. et al. (2005) "Maximize the Performance of Spray Nozzle Systems," *CEP Magazine,* Dec. 2005, pp. 38-44.

Reyes, S. C. et al. (1997) "Frequency Modulation Methods for Diffusion and Adsorption Measurements in Porous Solids," *J. Phys. Chem. B,* v.101, pp. 614-622.

Thomas, E. R. et al. (1987) "Conceptual Studies Using the Controlled Freeze Zone (CFZ) Process," *AIChE Summer Nat'l Mtg.,* Aug. 16-19, 1987, 16 pages.

Thomas, E. R. et al. (1988) "Conceptual Studies for $CO_2$/Natural Gas Separation Using the Control Freeze Zone (CFZ) Process," *Gas Separation and Purification,* v. 2, pp. 84-89.

Victory, D. J. et al. (1987) "The CFZ Process: Direct Methane-Carbon Dioxide Fractionation," *66th Ann. GPA Convention,* Mar. 16-18, Denver, CO, 4 pages.

\* cited by examiner

US 9,829,246 B2

CRYOGENIC SYSTEMS FOR REMOVING ACID GASES FROM A HYDROCARBON GAS STREAM USING CO-CURRENT SEPARATION DEVICES

CROSS-REFERENCE TO RELATED APPLICATIONS

This application is the National Stage entry under 35 U.S.C. §371 of PCT/US2011/042203, filed on Jun. 28, 2011, which claims the benefit of U.S. Provisional Application No. 61/369,377, filed on Jul. 30, 2010, and U.S. Provisional Application No. 61/500,314, filed on Jun. 23, 2011, each of which are incorporated herein by reference in their entirety for all purposes.

FIELD OF THE INVENTION

The present invention relates to the field of fluid separation. More specifically, the present invention relates to the separation of carbon dioxide and other acid gases from a hydrocarbon fluid stream.

BACKGROUND

This section is intended to introduce various aspects of the prior art. This discussion is believed to assist in providing a framework to facilitate a better understanding of particular aspects of the present disclosure. Accordingly, it should be understood that this section should be read in this light, and not necessarily as admission of prior art.

The production of hydrocarbons from a reservoir oftentimes carries with it the incidental production of non-hydrocarbon gases. Such gases include contaminants such as carbon dioxide ($CO_2$) and hydrogen sulfide ($H_2S$). When $CO_2$ and $H_2S$ are produced as part of a hydrocarbon gas stream (such as methane ($C_1$) or ethane ($C_2$)), the gas stream is sometimes referred to as "sour gas."

Sour gas is usually treated to remove $CO_2$, $H_2S$, and other contaminants before it is sent downstream for further processing or sale. Removal of acid gases creates a "sweetened" hydrocarbon gas stream. The sweetened stream may be used as an environmentally-acceptable fuel or as feedstock to a chemicals or gas-to-liquids facility. The sweetened gas stream may be chilled to form liquefied natural gas, or LNG.

The gas separation process creates an issue as to the disposal of the separated contaminants. In some cases, the concentrated acid gas (consisting primarily of $H_2S$ and $CO_2$) is sent to a sulfur recovery unit ("SRU"). The SRU converts the $H_2S$ into benign elemental sulfur. However, in some areas (such as the Caspian Sea region), additional elemental sulfur production is undesirable because there is a limited market. Consequently, millions of tons of sulfur have been stored in large, above-ground blocks in some areas of the world, most notably Canada and Kazakhstan.

While the sulfur is stored on land, the carbon dioxide associated with the acid gas is oftentimes vented to the atmosphere. However, the practice of venting $CO_2$ is sometimes undesirable. One proposal to minimize $CO_2$ emissions is a process called acid gas injection ("AGI"). AGI means that unwanted sour gases are re-injected into a subterranean formation under pressure and sequestered for potential later use. Alternatively, the carbon dioxide is used to create artificial reservoir pressure for enhanced oil recovery operations.

To facilitate AGI, it is desirable to have a gas processing facility that effectively separates out the acid gas components from the hydrocarbon gases. Some natural gas reservoirs contain relatively low percentages of hydrocarbons (less than 40%, for example) and high percentages of acid gases, principally carbon dioxide, but also hydrogen sulfide, carbonyl sulfide, carbon disulfide, and various mercaptans. In these instances, cryogenic gas processing may be beneficially employed.

Cryogenic gas processing is a distillation process sometimes used for gas separation. However, conventional cryogenic distillation towers may be bulky and/or create weight distribution issues for offshore vessels and platforms. Moreover, for gas streams having unusually high levels of $CO_2$ (such as greater than about 30 mol. percent), additional processing may be needed to remove methane that becomes entrained in the bottoms liquid stream, or to remove carbon dioxide that becomes entrained in the overhead gas stream.

Challenges also exist with respect to cryogenic distillation of sour gas. For example, at higher $CO_2$ concentrations, e.g., greater than about 5 mol. percent at total pressure less than about 700 psig, $CO_2$ may freeze out as a solid in the cryogenic distillation tower. The formation of $CO_2$ as a solid disrupts the cryogenic distillation process.

Therefore, there is a need for improved cryogenic distillation systems, which resolve one or more of the problems identified above.

SUMMARY

Provided are systems for removing acid gases from a raw gas stream, including components (a)-(e): (a) a dehydration vessel for receiving the raw gas stream, and separating the raw gas stream into a dehydrated raw gas stream and a stream comprised substantially of an aqueous fluid, (b) a heat exchanger for cooling the dehydrated gas stream, and releasing a cooled sour gas stream, (c) a cryogenic distillation tower that receives the cooled sour gas stream, and separates the cooled sour gas stream into (i) an overhead gas stream comprised primarily of methane, and (ii) a bottom liquefied acid gas stream comprised primarily of carbon dioxide, (d) a final co-current contactor, and (e) a first-co-current contactor.

In one or more embodiments, the present system utilizes a lower distillation section that is substantially reduced in size compared to conventional systems. In some embodiments, the lower distillation section is completely removed. In one or more embodiments, the system is configured so that methane gas entrained in the cold, bottoms liquid stream is captured using a series of small, co-current separation devices, and redirected back into the controlled freezing section. In one or more embodiments, the system is configured so that carbon dioxide entrained in the overhead methane gas stream is captured using a series of small, co-current separation devices, and redirected back into the controlled freezing section.

Also provided are methods of using the system for removing acid gases from a raw gas stream.

BRIEF DESCRIPTION OF THE DRAWINGS

So that the manner in which the present inventions can be better understood, certain illustrations, charts, and/or flow charts are appended herein. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

Figure 1:
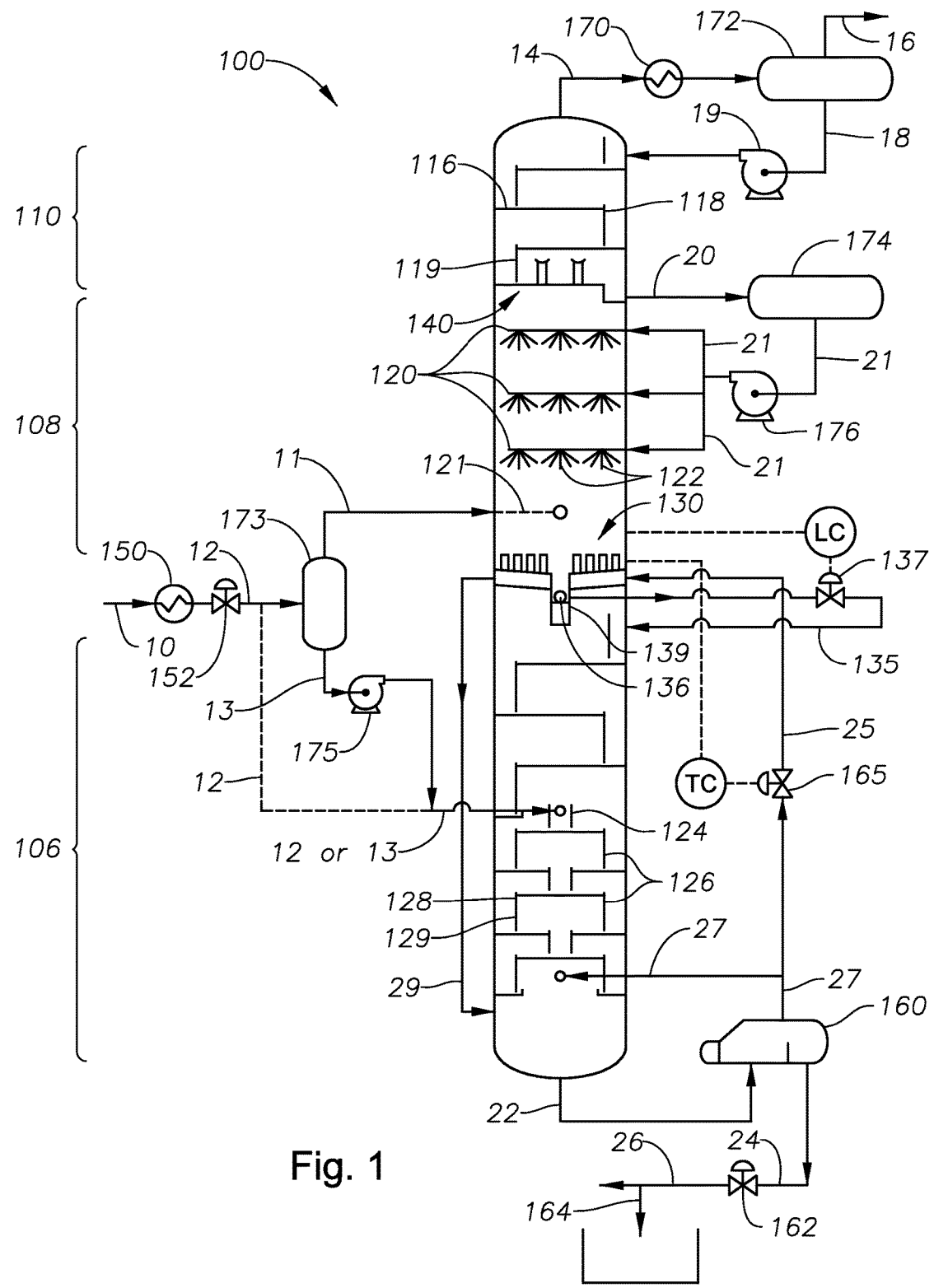
FIG. 1 is a side view of an illustrative cryogenic distillation tower, in one embodiment. A chilled raw gas stream is being injected into the intermediate controlled freezing zone of the tower.

As used herein, the term "hydrocarbon" refers to an organic compound that includes primarily, if not exclusively, the elements hydrogen and carbon. Hydrocarbons generally fall into two classes: aliphatic, or straight chain hydrocarbons, and cyclic, or closed ring hydrocarbons, including cyclic terpenes. Examples of hydrocarbon-containing materials include any form of natural gas, oil, coal, and bitumen that can be used as fuel or upgraded into a fuel.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions, or at ambient conditions (15° C. and 1 atm pressure). Hydrocarbon fluids may include, for example, oil, natural gas, coal bed methane, shale oil, pyrolysis oil, pyrolysis gas, a pyrolysis product of coal, and other hydrocarbons that are in a gaseous or liquid state.

The term "mass transfer device" refers to any object that receives fluids to be contacted, and passes those fluids to other objects, such as through gravitational flow. One nonlimiting example is a tray for stripping out certain components. A grid packing is another example.

As used herein, the term "fluid" refers to gases, liquids, and combinations of gases and liquids, as well as to combinations of gases and solids, and combinations of liquids and solids.

As used herein, the term "condensable hydrocarbons" means those hydrocarbons that condense at about 15° C. and one atmosphere absolute pressure. Condensable hydrocarbons may include, for example, a mixture of hydrocarbons having carbon numbers greater than 4.

As used herein, the term "heavy hydrocarbons" refers to hydrocarbons having more than one carbon atom. Principal examples include ethane, propane, and butane. Other examples include pentane, aromatics, or diamondoids.

As used herein, the term "closed loop refrigeration system" means any refrigeration system wherein an external working fluid such as propane or ethylene is used as a coolant to chill an overhead methane stream. This is in contrast to an "open loop refrigeration system" wherein a portion of the overhead methane stream itself is used as the working fluid.

As used herein, the term "co-current contacting device" or "co-current contactor" means a vessel that receives (i) a stream of gas and (ii) a separate stream of solvent or liquefied gas in such a manner that the gas stream and the solvent stream (or liquefied gas, as the case may be) contact one another while flowing in generally the same directions within the contacting device. Non-limiting examples include an eductor and a coalescer, or a static mixer plus deliquidizer.

"Non-absorbing gas" means a gas that is not significantly absorbed by a solvent or liquefied gas during a gas sweetening process.

As used herein, the term "natural gas" refers to a multi-component gas obtained from a crude oil well (associated gas) or from a subterranean gas-bearing formation (non-associated gas). The composition and pressure of natural gas can vary significantly. A typical natural gas stream contains methane ($C_1$) as a significant component. The natural gas steam may also contain ethane ($C_2$), higher molecular weight hydrocarbons, and one or more acid gases. The natural gas may also contain minor amounts of contaminants such as water, nitrogen, wax, and crude oil.

As used herein, an "acid gas" means any gas that dissolves in water producing an acidic solution. Nonlimiting examples of acid gases include hydrogen sulfide ($H_2S$), and carbon dioxide ($CO_2$). Sulfurous compounds include carbon disulfide ($CS_2$), carbonyl sulfide (COS), mercaptans, or mixtures thereof.

The term "liquid solvent" means a fluid in substantially liquid phase that preferentially absorbs acid gases, thereby removing or "scrubbing" at least a portion of the acid gas components from a gas stream. The gas stream may be a hydrocarbon gas stream or other gas stream, such as a gas stream having nitrogen.

"Sweetened gas stream" refers to a fluid stream in a substantially gaseous phase that has had at least a portion of acid gas components removed.

As used herein, the terms "lean" and "rich," with respect to the absorbent liquid removal of a selected gas component from a gas stream, are relative, merely implying, respectively, a lesser or greater degree of content of the selected gas component. The respective terms "lean" and "rich" do not necessarily indicate or require, respectively, either that an absorbent liquid is totally devoid of the selected gaseous component, or that it is incapable of absorbing more of the selected gas component.

The term "raw gas stream" refers to a hydrocarbon fluid stream wherein the fluids are primarily in a gaseous phase, and which has not undergone steps to remove carbon dioxide, hydrogen sulfide, or other acidic components.

The term "sour gas stream" refers to a hydrocarbon fluid stream wherein the fluids are primarily in a gaseous phase, and contain at least 3 mol. percent carbon dioxide and/or more than 4 ppm hydrogen sulfide.

As used herein, the term "subsurface" refers to geologic strata occurring below the earth's surface.

Systems for Removing Acid Gases

Provided are systems for removing acid gases from a raw gas stream. In one embodiment, the system first includes a dehydration vessel. The dehydration vessel may be a vessel that uses glycol or other chemical to remove water or brine from a hydrocarbon fluid stream. The dehydration vessel receives the raw gas stream, and separates the raw gas stream into a dehydrated raw gas stream and a stream comprised substantially of an aqueous fluid.

The system also includes a heat exchanger. The heat exchanger receives the dehydrated raw gas stream and cools it through heat exchange with a colder working fluid or other mechanism. Cooling may include, for example, use of an expansion valve. The heat exchanger releases a cooled sour gas stream.

The system also includes a cryogenic distillation tower. The cryogenic distillation tower is preferably a CFZ™ tower, as discussed below. The cryogenic distillation tower receives the cooled sour gas stream, and separates the cooled sour gas stream into (i) an overhead gas stream comprised primarily of methane, and (ii) a bottom liquefied acid gas stream comprised primarily of carbon dioxide.

The system further includes a final co-current contactor. The final co-current contactor is configured to receive the bottom liquefied acid gas stream, or liquid from an optional melt tray. Therefore, it may be referred to as a final lower co-current contactor. The final co-current contactor also receives a partially-methane-enriched gas stream from a previous co-current contactor.

The final co-current contactor provides for rapid mixing of the bottom liquefied acid gas stream and the partially methane-enriched gas stream. From there, the final co-current contactor releases a final methane-enriched gas stream back into the cryogenic distillation tower. The final co-current contactor also releases a first partially-stripped acid gas liquid.

The system also includes a first co-current contactor. The first co-current contactor is configured to receive a stripping gas, for example from a reboiler. In one aspect, the stripping gas is carbon dioxide. The first co-current contactor is in series with the final lower co-current contactor. Therefore, the first co-current contactor may be referred to as a first lower co-current contactor. The first lower co-current contactor also receives a second partially-stripped acid gas liquid from a second co-current contactor. In one aspect, the second partially-stripped acid gas liquid comprises about 98 mol. percent or more carbon dioxide.

The first co-current contactor provides for rapid mixing of the stripping gas and the final stripped acid gas liquid. From there, the first co-current contactor releases a final stripped acid gas liquid. The first co-current contactor also releases a first partially methane-enriched gas stream to the second co-current contactor.

Preferably, a substantial portion of the final stripped acid gas liquid is injected into a subsurface formation through one or more acid gas injection wells. However, a portion of the final stripped acid gas liquid may be diverted and re-used as the stripping gas via introduction to the reboiler.

The system may have only the two co-current contactors for processing the bottom liquefied acid gas stream. In this instance, the final co-current contactor is the second co-current contactor, while the previous co-current contactor is the first co-current contactor. Further, the first partially-methane-enriched gas stream released by the first co-current contactor is the partially methane-enriched gas stream received by the final co-current contactor. In addition, the first partially-stripped acid gas liquid received by the final co-current contactor is the second partially-stripped acid gas liquid received by the first co-current contactor.

Alternatively, the system may have three co-contactors for processing the bottom liquefied acid gas stream. In this instance, the previous co-current contactor is a second co-current contactor. The second co-current contactor is then configured to receive the first partially methane-enriched gas stream from the first co-current contactor, and the first partially-stripped acid gas liquid from the final co-current contactor. Further, the second co-current contactor releases a second partially methane-enriched gas stream to the final co-current contactor, and a second partially-stripped acid gas liquid to the first co-current contactor.

Alternatively, the system may have more than three co-current contactors for processing the bottom acid gas stream. The final co-current contactor, any intermediate co-contactors, the second co-current contactor and the first co-current contactor are arranged to deliver respective stripped acid gas liquids as progressively $CO_2$-richer acid gas liquids in series. At the same time, the first co-current contactor, the second co-current contactor, any intermediate co-contactors, and the final co-current contactor are arranged to deliver the respective methane-enriched gas streams as progressively methane-enriched gas streams in series.

In any of these systems, the cryogenic distillation tower may have a melt tray below the freezing zone. The melt tray receives a cold slurry of acid gas components, and then delivers the slurry to the final lower co-current contacting device as the bottom liquefied acid gas stream.

An alternative system for removing acid gases from a raw gas stream is provided herein. Once again, the system includes a dehydration vessel for receiving the raw gas stream, and separating the raw gas stream into a dehydrated raw gas stream and a stream comprised substantially of an aqueous fluid. In addition, the system again includes a heat exchanger for cooling the dehydrated raw gas stream, and releasing a cooled sour gas stream.

The system also includes a cryogenic distillation tower. The cryogenic distillation tower is preferably a CFZ™ tower, such as the column discussed below. The cryogenic distillation tower receives the cooled sour gas stream, and separates the cooled sour gas stream into (i) an overhead gas stream comprised primarily of methane, and (ii) a bottom liquefied acid gas stream comprised primarily of carbon dioxide.

The system further includes a first co-current contactor. The first co-current contactor is configured to receive the overhead gas stream. Therefore, it may be referred to as a first upper co-current contactor. The first co-current contactor also receives a second partially-$CO_2$-enriched reflux liquid from a second co-current contactor.

The first co-current contactor provides for rapid mixing of the overhead gas stream and the second partially-$CO_2$-enriched reflux liquid. From there, the first co-current contactor releases a first partially-sweetened methane gas stream to the second co-current contactor. The first co-current contactor also releases a final $CO_2$-enriched reflux liquid back to the cryogenic distillation tower.

The system also includes a final co-current contactor. The final co-current contactor is configured to receive a partially-sweetened gas. In one aspect, the partially-sweetened gas is methane. The final co-current contactor is in series with the first upper co-current contactor. Therefore, the final co-current contactor may be referred to as a final upper co-current contactor. The final upper co-current contactor also receives a reflux liquid. The reflux liquid is preferably methane.

The final co-current contactor provides for rapid mixing of the reflux liquid and the final partially-sweetened methane gas. From there, the final co-current contactor releases a first partially-$CO_2$-enriched reflux liquid to the next-to-last co-current contactor. The final co-current contactor also releases a final sweetened methane gas stream. In one aspect the final sweetened methane gas stream comprises about 99 mol. percent or more methane.

Preferably, a substantial portion of the final sweetened methane gas stream is delivered for liquefaction and sale.

However, a portion of the final sweetened methane gas stream may be diverted and used to generate the reflux liquid.

The system may have only the two co-current contactors for processing the overhead gas stream. In this instance, the final co-current is the second co-current contactor, while the next-to-last co-current contactor is the first co-current contactor. Further, the first partially-sweetened methane gas stream released by the first co-current contactor is the next-to-last partially sweetened methane gas stream received by the final co-current contactor. In addition, the second partially-$CO_2$-enriched reflux liquid received by the first co-current contactor is the first partially-$CO_2$-enriched reflux liquid released by the final co-current contactor.

Alternatively, the system may have three co-contactors for processing the overhead gas stream. In this instance, the next-to-last co-current contactor is a second co-current contactor. The second co-current contactor is then configured to receive the first partially-sweetened methane gas stream from the first co-current contactor, and the first partially-$CO_2$-enriched reflux liquid from the final co-current contactor. Further, the second co-current contactor releases a second partially-sweetened methane gas stream to the final co-current contactor, and a final partially-$CO_2$-enriched reflux liquid to the first co-current contactor.

Alternatively, the system may have more than three co-current contactors for processing the overhead gas stream. The final co-current contactor, any intermediate co-contactors, the second co-current contactor and the first co-current contactor are arranged to deliver respective partially-$CO_2$-enriched reflux liquids as progressively $CO_2$-enriched reflux liquids in series. At the same time, the first co-current contactor, the second co-current contactor, any intermediate co-contactors, and the final co-current contactor are arranged to deliver the respective sweetened gas streams as progressively sweetened gas streams in series.

In these systems, the cryogenic distillation tower also has an upper distillation zone. The upper distillation zone is above the freezing zone, and receives vapor from the freezing zone. The upper distillation zone then releases the overhead gas stream to the first upper co-current contacting device.

In one or more embodiments, a system is provided for removing acid gases from a raw gas stream that employs two sets of co-current contactors. Once set is placed in series to receive the bottom acid gas stream and concentrate it using a stripping gas such as carbon dioxide. The other set is placed in series to receive the overhead gas stream, and sweeten it using a reflux liquid such as methane. In the first instance, the stripping gas is directed back into the cryogenic distillation column for further processing. In the latter instance, the sweetened gas is optionally liquefied and delivered for commercial sale, or is used as fuel gas on-site.

Cryogenic Separation

Typically, cryogenic gas separation generates a cooled overhead gas stream at moderate pressures (e.g., 350-500 pounds per square inch gauge (psig)). In addition, liquefied acid gas is generated as a "bottoms" product. Since liquefied acid gas has a relatively high density, hydrostatic head can be beneficially used in an AGI well to assist in the injection process. This means that the energy required to pump the liquefied acid gas into the formation is lower than the energy required to compress low-pressure acid gases to reservoir pressure. Fewer stages of compressors and pumps are required.

Challenges exist with respect to cryogenic distillation of sour gases. When $CO_2$ is present at concentrations greater than about 5 mol. percent at total pressure less than about 700 psig in the gas to be processed, it will freeze out as a solid in a standard cryogenic distillation unit. The formation of $CO_2$ as a solid disrupts the cryogenic distillation process. To circumvent this problem, the assignee has previously designed various "Controlled Freeze Zone™" (CFZ™) processes. The CFZ™ process takes advantage of the propensity of carbon dioxide to form solid particles by allowing frozen $CO_2$ particles to form within an open portion of the distillation tower, and then capturing the particles on a melt tray. As a result, a clean methane stream (along with any nitrogen or helium present in the raw gas) is generated at the top of the tower, while a cold liquid $CO_2/H_2S$ stream is generated at the bottom of the tower.

Certain aspects of the CFZ™ process and associated equipment are described in U.S. Pat. No. 4,533,372; U.S. Pat. No. 4,923,493; U.S. Pat. No. 5,062,270; U.S. Pat. No. 5,120,338; and U.S. Pat. No. 6,053,007, which are each herein incorporated by reference in their entirety.

As generally described in the above U.S. patents, the distillation tower, or column, used for cryogenic gas processing includes a lower distillation zone and an intermediate controlled freezing zone. Preferably, an upper distillation zone is also included. The column operates to create solid $CO_2$ particles by providing a portion of the column having a temperature range below the freezing point of carbon dioxide, but above the boiling temperature of methane at that pressure. More preferably, the controlled freezing zone is operated at a temperature and pressure that permits methane and other light hydrocarbon gases to vaporize, while causing $CO_2$ to form frozen (solid) particles.

As the gas feed stream moves up the column, frozen $CO_2$ particles break out of the dehydrated, raw feed stream and gravitationally descend from the controlled freezing zone onto a melt tray. There, the particles liquefy. A carbon dioxide-rich liquid stream then flows from the melt tray down to the lower distillation zone at the bottom of the column. The lower distillation zone is maintained at a temperature and pressure at which substantially no carbon dioxide solids are formed, but dissolved methane boils out. In one aspect, a bottom acid stream is created at 30° F. to 40° F.

In one embodiment, some or all of the frozen $CO_2$ particles may be collected on a tray at the bottom of the freezing zone. The particles are then transported out of the distillation tower for further processing.

The controlled freezing zone includes a cold liquid spray. This is a methane-enriched liquid stream known as "reflux." As the vapor stream of light hydrocarbon gases and entrained sour gases moves upward through the column, the vapor stream encounters the liquid spray. The cold liquid spray aids in breaking out solid $CO_2$ particles while permitting methane gas to evaporate and flow upward in the column.

In the upper distillation zone (sometimes referred to as a rectification zone), the methane is captured overhead and piped away for sale or made available for fuel. In one aspect, the overhead methane stream is released at about −130° F. The overhead gas may be partially liquefied by additional cooling, and a part of the liquid returned to the column as the reflux. The liquid reflux is injected as the cold spray into the spray section of the controlled freezing zone, usually after flowing through trays or packing of the rectification section of the column.

Specific Embodiments

FIG. 1 presents a schematic view of a cryogenic distillation tower 100 used in connection with the separation of carbon dioxide from a raw natural gas stream. The cryogenic distillation tower 100 may be interchangeably referred to herein as a "column", a "CFZ column," or just a "tower."

The cryogenic distillation tower 100 of FIG. 1 receives an initial fluid stream 10. The fluid stream 10 is comprised primarily of production gases. Typically, the fluid stream represents a dried gas stream from a wellhead or collection of wellheads (not shown), and contains about 65% to about 95% methane. However, the fluid stream 10 may contain a lower percentage of methane, such as about 30% to 65%, or even as low as 20% to 40%.

The methane may be present along with trace elements or other hydrocarbon gases such as ethane. In addition, trace elements of helium and nitrogen may be present. In the present application, the fluid stream 10 will also include certain contaminants. These include acid gases such as $CO_2$ and $H_2S$.

The initial fluid stream 10 may be at a post-production pressure of approximately 600 pounds per square inch (psi). In some instances, the pressure of the initial fluid stream 10 may be up to about 750 psi or even 1,000 psi.

The fluid stream 10 is typically chilled before entering the distillation tower 100. A heat exchanger 150, such as a shell-and-tube exchanger, is provided for the initial fluid stream 10. A refrigeration unit (not shown) provides cooling fluid (such as liquid propane) to the heat exchanger 150 to bring the temperature of the initial fluid stream 10 down to about −30° F. to −40° F. The chilled fluid stream may then be moved through an expansion device 152. The expansion device 152 may be, for example, a Joule-Thompson ("J-T") valve.

The expansion device 152 serves as an expander to obtain additional cooling of the fluid stream 10. Preferably, partial liquefaction of the fluid stream 10 is achieved through expansion. A Joule-Thompson (or "J-T") valve is preferred for gas feed streams that are prone to forming solids. The expansion device 152 is preferably mounted close to the cryogenic distillation tower 100 to minimize heat loss in the feed piping and to minimize the chance of plugging with solids in case some components (such as $CO_2$ or benzene) are dropped below their freezing points.

As an alternative to a J-T valve, the expander device 152 may be a turbo-expander. A turbo-expander provides greater cooling and creates a source of shaft work for processes like a refrigeration unit. The heat exchanger 150 is part of a refrigeration unit. In this manner, the operator may minimize the overall energy requirements for the distillation process. However, the turbo-expander may not handle frozen particles as well as the J-T valve.

In either instance, the heat exchanger 150 and the expander device 152 convert the raw gas in the initial fluid stream 10 into a chilled fluid stream 12. Preferably, the temperature of the chilled fluid stream 12 is around −40° F. to −70° F. In one aspect, the cryogenic distillation tower 100 is operated at a pressure of about 550 psi, and the chilled fluid stream 12 is at approximately −62° F. At these conditions, the chilled fluid stream 12 is in a substantially liquid phase, although some vapor phase may inevitably be entrained into the chilled fluid stream 12. Most likely, no solids formation has arisen from the presence of $CO_2$.

The CFZ™ cryogenic distillation tower 100 is divided into three primary sections. These are a lower distillation zone, or "stripping section" 106, an intermediate controlled freezing section, or "spray section" 108, and an upper distillation zone, or "rectification section" 110. In the tower arrangement of FIG. 1, the chilled fluid stream 12 is introduced into the distillation tower 100 in the controlled freezing zone 108. However, the chilled fluid stream 12 may alternatively be introduced near the top of the lower distillation zone 106.

It is noted in the arrangement of FIG. 1 that the lower distillation zone 106, the intermediate spray section 108, the upper distillation zone 110, and the related components are housed within a single vessel 100. However, for offshore applications in which height of the tower 100 and motion may need to be considered, or for remote locations in which transportation limitations are an issue, the tower 110 may optionally be split into two separate pressure vessels (not shown). For example, the lower distillation zone 106 and the controlled freezing zone 108 may be located in one vessel, while the upper distillation zone 108 is in another vessel. External piping would then be used to interconnect the two vessels.

In either embodiment, the temperature of the lower distillation zone 106 is higher than the feed temperature of the chilled fluid stream 12. The temperature of the lower distillation zone 106 is designed to be well above the boiling point of the methane in the chilled fluid stream 12 at the operating pressure of the column 100 In this manner, methane is preferentially stripped from the heavier hydrocarbon and liquid acid gas components. Of course, those of ordinary skill in the art will understand that the liquid within the distillation tower 100 is a mixture, meaning that the liquid will "boil" at some intermediate temperature between pure methane and pure $CO_2$. Further, in the event that there are heavier hydrocarbons present in the mixture (such as ethane or propane), this will increase the boiling temperature of the mixture. These factors become design considerations for the operating temperatures within the cryogenic distillation tower 100

In the lower distillation zone 106, the $CO_2$ and any other liquid-phase fluids gravitationally fall towards the bottom of the cryogenic distillation tower 100. At the same time, methane and other vapor-phase fluids break out and rise upwards towards the top of the tower 100. This separation is accomplished primarily through the density differential between the gas and liquid phases. However, the separation process is optionally aided by internal components within the distillation tower 100. As described below, these include a melt tray 130, a plurality of advantageously-configured mass transfer devices 126, and an optional heater line 25. A side reboiler (seen at 173) may likewise be added to the lower distillation zone 106 to facilitate removal of methane.

Referring again to FIG. 1, the chilled fluid stream 12 may be introduced into the column 100 near the top of the lower distillation zone 106. Alternatively, it may be desirable to introduce the feed stream 12 into the controlled freezing zone 108 above the melt tray 130. The point of injection of the chilled fluid stream 12 is a design issue dictated primarily by the composition of the initial fluid stream 10.

Where the temperature of the chilled fluid stream 12 is high enough (such as greater than −70° F.) such that solids are not expected, it may be preferable to inject the chilled fluid stream 12 directly into the lower distillation zone 106 through a two-phase flashbox type device (or vapor distributor) 124 in the column 100. The use of a flashbox 124 serves to at least partially separate the two-phase vapor-liquid mixture in the chilled fluid stream 12. The flashbox 124 may be slotted such that the two-phase fluid impinges against baffles in the flashbox 124

If solids are anticipated due to a low inlet temperature, the chilled fluids stream 12 may need to be partially separated in a vessel 173 prior to feeding the column 100 as described above. In this case, the chilled feed stream 12 may be separated in a two phase separator 173 to minimize the possibility of solids plugging the inlet line and internal components of the column 100. Gas vapor leaves the phase separator 173 through a vessel inlet line 11, where it enters the spray section 108 through an inlet distributor 121. The gas then travels upward through the column 100. At the same time, a liquid/solid slurry 13 is discharged from the phase separator 173. The liquid/solid slurry is directed into the column 100 through the vapor distributor 124 and to the melt tray 130. The liquid/solid slurry 13 can be fed to the lower distillation zone 106 by gravity or by a pump 175.

In either arrangement, that is, with or without the two phase separator 173, the chilled fluid stream 12 (or 11) enters the column 100. The liquid component travels down a collection of stripping trays 126 within the lower distillation zone 106. The stripping trays 126 typically include a series of weirs 128 and downcomers 129. The stripping trays 126, in combination with the warmer temperature in the lower distillation zone 106, cause methane to break out of solution. The resulting vapor carries the methane and any entrained carbon dioxide molecules that have boiled off upward through the column 100.

In the arrangement of FIG. 1, the vapor proceeds upward through risers or chimneys of the melt tray 130 and into the freezing zone 108. The chimneys 131 act as a vapor distributor for uniform distribution through the freeze zone 108. The vapor will then contact cold liquid from spray headers 120 to "freeze out" the $CO_2$. Stated another way, $CO_2$ will freeze and then precipitate or "snow" back onto the melt tray 130. The solid $CO_2$ then melts and gravitationally flows in liquid form down the melt tray 130 and through the lower distillation zone 106 there below.

As will be discussed more fully below, the spray section 108 is an intermediate freeze zone of the cryogenic distillation tower 100. With the alternate configuration in which the chilled fluid stream 12 is separated in vessel 173 prior to entering the tower 100, a small portion of the liquid/solid slurry 13 is inevitably introduced into the tower 100 immediately above the melt tray 130. Thus, a liquid-solid mixture of acid gas and heavier hydrocarbon components will flow from the distributor 121, with solids and liquids falling down onto the melt tray 130.

The melt tray 130 is configured to gravitationally receive liquid and solid materials, primarily $CO_2$ and $H_2S$ from the intermediate controlled freezing zone 108. The melt tray 130 serves to warm the liquid and solid materials and direct them downward through the lower distillation zone 106 in liquid form for further purification. The melt tray 130 collects and warms the solid-liquid mixture from the controlled freezing zone 108 in a pool of liquid. The melt tray 130 is designed to release vapor flow back to the controlled freezing zone 108, to provide adequate heat transfer to melt the solid $CO_2$, and to facilitate liquid/slurry drainage to the lower distillation zone 106 of the column 100 below the melt tray 130.

Additional details concerning the Controlled Freeze Zone tower 100 are disclosed in U.S. Pat. Publ. No. 2010/0018248, entitled "Controlled Freeze Zone Tower", which is herein incorporated by reference in its entirety. For example, FIG. 2A of the 2010 publication provides a plan view of the melt tray 130, in one embodiment. FIG. 2B provides a cross-sectional view of the melt tray 130, taken across line B-B of FIG. 2A. FIG. 2C shows a cross-sectional view of the melt tray 130, taken across line C-C.

Referring again to FIG. 1, the melt tray 130 may also be designed with an external liquid transfer system. The external transfer system serves to ensure that all liquid is substantially free of solids and that sufficient heat transfer has been provided. The transfer system first includes a draw-off nozzle 136. In one embodiment, the draw-off nozzle 136 resides within the draw-off sump, or channel 138 (shown in FIG. 2C of the 2010 publication). Fluids collected in the channel 138 are delivered to a transfer line 135. Flow through the transfer line 135 may be controlled by a control valve 137 and a level controller "LC" (seen in FIG. 1). Fluids are returned to the lower distillation zone 106 via the transfer line 135. If the liquid level is too high, the control valve 137 opens; if the liquid level is too low, the control valve 137 closes. If the operator chooses not to employ the transfer system in the lower distillation zone 106, then the control valve 137 is closed and fluids are directed immediately to the mass transfer devices, or "stripping trays" 126 below the melt tray 130 for stripping via an overflow downcomer 139.

Whether or not an external transfer system is used, solid $CO_2$ is warmed on the melt tray 130 and converted to a $CO_2$-rich liquid. The melt tray 130 is heated from below by vapors from the lower distillation zone 106. Supplemental heat may optionally be added to the melt tray 130 or just above the melt tray base 134 by various means such as heater line 25. The heater liner 25 utilizes thermal energy already available from a bottom reboiler 160 to facilitate thawing of the solids.

The $CO_2$-rich liquid is drawn off from the melt tray 130 under liquid level control and gravitationally introduced to the lower distillation zone 106. As noted above, a plurality of stripping trays 126 is provided in the lower distillation zone 106 below the melt tray 130. The stripping trays 126 are preferably in a substantially parallel relation, one above the other. Each of the stripping trays 126 may optionally be positioned at a very slight incline, with a weir such that a liquid level is maintained on the tray. Fluids gravitationally flow along each tray, over the weir, and then flow down onto the next tray via a downcomer.

Figure 3:
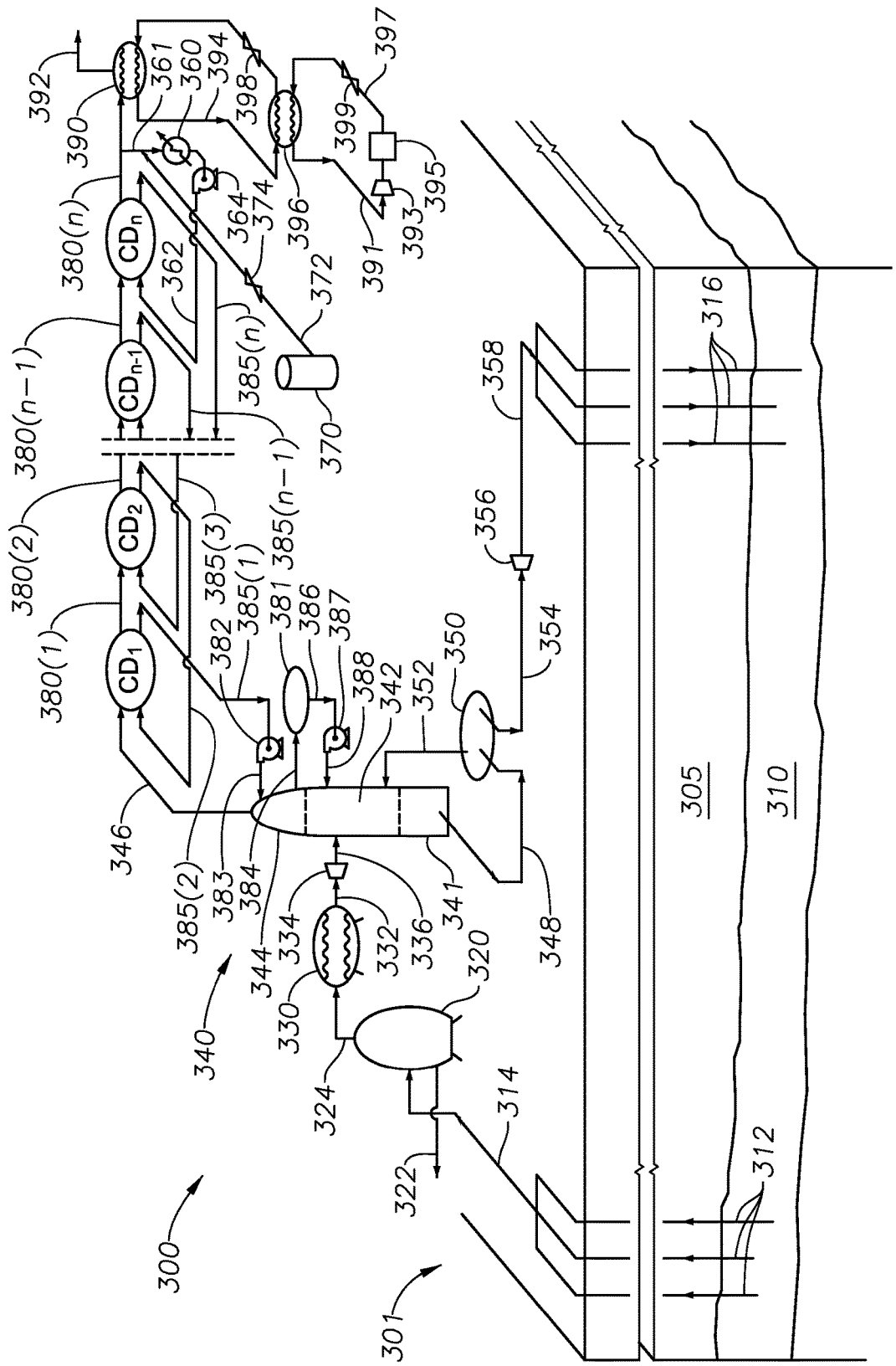
FIG. 3 provides a schematic diagram showing a gas processing facility for removing acid gases from a gas stream in accordance with the present invention, in an alternate embodiment. The gas processing facility employs a series of co-current contactors for further sweetening methane from the overhead gas stream.

The stripping trays 126 may be in a variety of arrangements. The stripping trays 126 may be arranged in generally horizontal relation to form a back-and-forth, cascading liquid flow. However, it is preferred that the stripping trays 126 be arranged to create a cascading liquid flow that is divided by separate stripping trays substantially along the same horizontal plane. This is shown in the arrangement of FIG. 3 of the 2010 publication, where the liquid flow is split at least once so that liquid flows across separate trays and falls into two opposing downcomers 129.

The percentage of methane in the liquid becomes increasingly small as the liquid moves downward through the lower distillation zone 106. The extent of distillation depends on the number of trays 126 in the lower distillation zone 106. In the upper part of the lower distillation zone 106, the methane content of the liquid may be as high as 25 mol. percent, while at the bottom stripping tray the methane content may be as low as 0.04 mol. percent. The methane content flashes out quickly along the stripping trays 126 (or other mass transfer devices). The number of mass transfer devices used in the lower distillation zone 106 is a matter of design choice based on the composition of the raw gas stream 10. However, only a few levels of stripping trays 126 need be typically utilized to remove methane to a desired level of 1% or less in the liquefied acid gas, for example.

Various individual stripping tray 126 configurations that facilitate methane breakout may be employed. The stripping tray 126 may simply represent a panel with sieve holes or bubble caps. However, to provide further heat transfer to the fluid and to prevent unwanted blockage due to solids, so called "jet trays" may be employed below the melt tray. In lieu of trays, random or structured packing may also be employed. FIGS. 4A and 4B of the 2010 publication show an illustrative jet tray 426.

In operation, one or more jet trays may be located in the lower distillation zone 106 and/or the upper distillation zone 110 of the tower 100. The trays may be arranged with multiple passes such as the pattern of stripping trays 126. However, any tray or packing arrangement may be utilized that facilitates the breakout of methane gas. Fluid cascades down upon each jet tray.

As the down-flowing liquid hits the stripping trays 126, separation of materials occurs. Methane gas breaks out of solution and moves upward in vapor form. The $CO_2$, however, is generally cold enough and in high enough concentration that it mostly remains in liquid form and travels down to the bottom of the lower distillation zone 106, although some $CO_2$ will necessarily be vaporized in the process. The liquid is then moved out of the cryogenic distillation tower 100 in an exit line as a bottoms fluid stream 22.

Upon exiting the distillation tower 100, the bottoms fluid stream 22 enters a reboiler 160. In FIG. 1, the reboiler 160 is a kettle-type vessel that provides reboiled vapor to the bottom of the stripping trays 126. A reboiled vapor line is seen at 27. In addition, reboiled vapor may be delivered through a heater line 25 to provide supplemental heat to the melt tray 130. The supplemental heat is controlled through a valve 165 and temperature controller TC. Alternatively, a heat exchanger, such as a thermosyphon heat exchanger (not shown) may be used to cool the initial fluid stream 10 to economize energy. In this respect, the liquids entering the reboiler 160 remain at a relatively low temperature, for example, about 30° F. or 40° F. By heat integrating with the initial fluid stream 10, the operator may warm and partially boil the cool bottoms fluid stream 22 from the distillation tower 100 while pre-cooling the production fluid stream 10. For this case, the fluid providing supplemental heat through line 25 is a vapor phase return from the reboiler 160.

It is contemplated that under some conditions, the melt tray 130 may operate without heater line 25. In these instances, the melt tray 130 may be designed with an internal heating feature such as an electric heater. However, it is preferred that a heat system be offered that employs the heat energy available in the bottoms fluid stream 22. The warm fluids in heater line 25 exist in one aspect at 30° F. to 40° F., so they contain relative heat energy. Thus, in FIG. 1, a warm vapor stream in heater line 25 is shown being directed to the melt tray 130 through a heating coil (not shown) on the melt tray 130. The warm vapor stream may alternatively be tied to the transfer line 135.

In operation, most of the reboiled vapor stream is introduced at the bottom of the column through line 27, above the bottom liquid level and at or below the last stripping tray 126. As the reboiled vapor passes upward through each tray 126, residual methane is stripped out of the liquid. This vapor cools off as it travels up the tower. By the time the vapor stream from line 27 reaches the corrugated melt tray 130, the temperature may drop to about −20° F. to 0° F. However, this remains quite warm compared to the melting solid on the melt tray 130, which may be around −50° F. to −70° F. The vapor still has enough enthalpy to melt the solids $CO_2$ as it comes in contact with the melt tray 130.

Referring back to reboiler 160, fluids exit the reboiler 160 as a $CO_2$-rich liquid stream 24. The fluids in the liquid stream 24 may optionally be passed through an expander valve 162. The expander valve 162 reduces the pressure of the liquid stream, effectively providing a refrigeration effect. Thus, a chilled bottom stream 26 is provided. The $CO_2$-rich liquid exiting the reboiler 160 as the chilled bottom stream 26 may be pumped downhole through one or more AGI wells (seen schematically at 164 in FIG. 1). In some situations, the liquid $CO_2$ may be pumped into a partially recovered oil reservoir as part of an enhanced oil recovery process. Thus, the $CO_2$ could be a miscible injectant. As an alternative, the $CO_2$ may be used as a miscible flood agent for enhanced oil recovery.

Referring again to the lower distillation zone 106 of the tower 100, gas moves up through the lower distillation zone 106, through the chimneys 131 in the melt tray 130, and into the controlled freezing zone 108. The controlled freezing zone 108 defines an open chamber having a plurality of spray nozzles 122. As the vapor moves upward through the controlled freezing zone 108, the temperature of the vapor becomes much colder. The vapor is contacted by liquid methane ("reflux") coming from the spray nozzles 122. This liquid methane is much colder than the upwardly-moving vapor, having been chilled by an external refrigeration unit that includes a heat exchanger 170. In one arrangement, the liquid methane exits from spray nozzles 122 at a temperature of approximately −120° F. to −130° F. However, as the liquid methane evaporates, it absorbs heat from its surroundings, thereby reducing the temperature of the upwardly-moving vapor. The vaporized methane also flows upward due to its reduced density (relative to liquid methane) and the pressure gradient within the distillation tower 100.

As the methane vapors move further up the cryogenic distillation tower 100, they leave the intermediate controlled freezing zone 108 and enter the upper distillation zone 110. The vapors continue to move upward along with other light gases broken out from the original chilled fluid stream 12 (or vessel inlet line 11). The combined hydrocarbon vapors move out of the top of the cryogenic distillation tower 100, becoming an overhead methane stream 14.

The hydrocarbon gas in overhead methane stream 14 is moved into the external refrigeration unit 170. In one aspect, the refrigeration unit 170 uses an ethylene refrigerant or other refrigerant capable of chilling the overhead methane stream 14 down to about −135° F. to −145° F. This serves to at least partially liquefy the overhead methane stream 14. The refrigerated methane steam 14 is then moved to a reflux condenser or separation chamber 172.

The separation chamber 172 is used to separate gas 16 from liquid, referred to sometimes as "liquid reflux" 18. The gas 16 represents the lighter hydrocarbon gases, primarily methane, from the original raw gas stream 10. Nitrogen and helium may also be present. The methane gas 16 is, of course, the "product" ultimately sought to be captured and sold commercially, along with any traces of ethane. This non-liquefied portion of the overhead methane stream 14 is also available for fuel on-site. The methane gas 16 may be further chilled for LNG transportation.

A portion of the overhead methane stream 14 exiting the refrigeration unit 170 is condensed. This portion is the liquid reflux 18 that is separated in the separation chamber 172 and returned to the tower 100 A pump 19 may be used to move the liquid reflux 18 back into the tower 100. Alternatively, the separation chamber 172 is mounted above the tower 100 to provide a gravity feed of the liquid reflux 18. The liquid reflux 18 will include some carbon dioxide that escaped from the upper distillation zone 110. However, most of the liquid reflux 18 is methane, typically 95% or more, with nitrogen (if present in the initial fluid stream 10) and traces of hydrogen sulfide (also if present in the initial fluid stream 10).

In one cooling arrangement, the overhead methane stream 14 is taken through an open-loop refrigeration system. In this arrangement, the overhead methane stream 14 is taken through a cross-exchanger to chill a return portion of the overhead methane stream used as the liquid reflux 18 Thereafter, the overhead methane stream 14 is pressurized to about 1,000 psi to 1,400 psi, and then cooled using ambient air and possibly an external propane refrigerant. The pressurized and chilled gas stream is then directed through an expander for further cooling. A turbo expander may be used to recover even more liquid as well as some shaft work. U.S. Pat. No. 6,053,007 entitled "Process for Separating a Multi-Component Gas Stream Containing at Least One Freezable Component," describes the cooling of an overhead methane stream, and is incorporated herein in its entirety by reference.

Returning again to FIG. 1, the liquid reflux 18 is returned into the upper distillation zone 110. The liquid reflux 18 is then gravitationally carried through one or more mass transfer devices 116 in the upper distillation zone 110. In one embodiment, the mass transfer devices 116 are rectification trays that provide a cascading series of weirs 118 and downcomers 119, similar to trays 126 described above.

As fluids from the liquid reflux stream 18 move downward through the rectification trays 116, additional methane vaporizes out of the upper distillation zone 110. The methane gases rejoin the overhead methane stream 14 to become part of the gas product stream 16. However, the remaining liquid phase of the liquid reflux 18 falls onto a collector tray 140. As it does so, the liquid reflux stream 18 unavoidably will pick up a small percentage of hydrocarbon and residual acid gases moving upward from the controlled freezing zone 108. The liquid mixture of methane and carbon dioxide is collected at a collector tray 140.

The collector tray 140 preferably defines a substantially planar body for collecting liquids. However, as with melt tray 130, collector tray 140 also has one, and preferably a plurality of chimneys for venting gases coming up from the controlled freezing zone 108. A chimney and cap arrangement such as that presented by components 131 and 132 in FIGS. 2B and 2C of the 2010 publication may be used.

It is noted here that in the upper distillation zone 110, any $H_2S$ present has a preference towards being dissolved in the liquid versus being in the gas at the processing temperature. In this respect, the $H_2S$ has a comparatively low relative volatility. By contacting the remaining vapor with more liquid, the cryogenic distillation tower 100 drives the $H_2S$ concentration down to within the desired parts-per-million (ppm) limits, such as a 10 or even a 4 ppm specification. As fluid moves through the mass transfer devices 116 in the upper distillation zone 110, the $H_2S$ contacts the liquid methane and is pulled out of the vapor phase and becomes a part of the liquid stream 20. From there, the $H_2S$ moves in liquid form downward through the lower distillation zone 106 and ultimately exits the cryogenic distillation tower 100 as part of the liquefied acid gas bottoms stream 22. For those cases where little to no $H_2S$ is present in the feed stream, or if $H_2S$ is selectively removed by an upstream process, virtually no $H_2S$ will be present in the overhead gas.

In the cryogenic distillation tower 100, the liquid captured at collector tray 140 is drawn out of the upper distillation zone 110 as a liquid stream 20. The liquid stream 20 is comprised primarily of methane. In one aspect, the liquid stream 20 is comprised of about 93 mol. percent methane, 3% $CO_2$, 0.5% $H_2S$, and 3.5% $N_2$. At this point, the liquid stream 20 is at about $-125°$ F. to $-130°$ F. This is only slightly warmer than the liquid reflux stream 18. The liquid stream 20 is directed into a reflux drum 174. The purpose of the reflux drum 174 is to provide surge capacity for a pump 176. Upon exiting the reflux drum 174, a spray stream 21 is created. Spray stream 21 is pressurized in a pump 176 for a second reintroduction into the cryogenic distillation tower 100. In this instance, the spray stream 21 is pumped into the intermediate controlled freezing zone 108 and emitted through nozzles 122.

Some portion of the spray stream 21, particularly the methane, vaporizes and evaporates upon exiting the nozzles 122. From there, the methane rises through the controlled freezing zone 108, through the chimneys in the collector tray 140, and through the mass transfer devices 116 in the upper distillation zone 110. The methane leaves the distillation tower 100 as the overhead methane stream 14 and ultimately becomes part of the commercial product in gas stream 16.

The spray stream 21 from the nozzles 122 also causes carbon dioxide to desublime from the gas phase. In this respect, $CO_2$ initially dissolved in the liquid methane may momentarily enter the gas phase and move upward with the methane. However, because of the cold temperature within the controlled freezing zone 108, any gaseous carbon dioxide quickly nucleates and agglomerates into a solid phase and begins to "snow." This phenomenon is referred to as desublimation. In this way, some $CO_2$ never re-enters the liquid phase until it hits the melt tray 130. This carbon dioxide "snows" upon the melt tray 130, and melts into the liquid phase. From there, the $CO_2$-rich liquid cascades down the mass transfer devices or trays 126 in the lower distillation zone 106, along with liquid $CO_2$ from the chilled raw gas stream 12 as described above. At that point, any remaining methane from the spray stream 21 of the nozzles 122 should quickly break out into vapor. These vapors move upwards in the cryogenic distillation tower 100 and re-enter the upper distillation zone 110.

It is desirable to have chilled liquid contacting as much of the gas that is moving up the tower 100 as possible. If vapor bypasses the spray stream 21 emanating from the nozzles 122, higher levels of $CO_2$ could reach the upper distillation zone 110 of the tower 100 To improve the efficiency of gas/liquid contact in the controlled freezing zone 108, a plurality of nozzles 122 having a designed configuration may be employed. Thus, rather than employing a single spray source at one or more levels with the reflux fluid stream 21, several spray headers 120 optionally designed with multiple spray nozzles 122 may be used. Thus, the configuration of the spray nozzles 122 has an impact on the heat and mass transfer taking place within the controlled freezing zone 108. Also, the nozzles themselves can be designed to generate optimal droplet sizes and areal distribution of those droplets.

The assignee herein has previously proposed various nozzle arrangements in co-pending U.S. Pat. Publ. No. 2010/0018248, referenced above. FIGS. 6A and 6B are referred to for teachings of nozzle configurations. The nozzles seek to ensure 360° coverage within the controlled freezing zone 108 and provide good vapor-liquid contact and heat/mass transfer. This, in turn, more effectively chills any gaseous carbon dioxide moving upward through the cryogenic distillation tower 100.

The cryogenic tower and associated heat transfer devices provide a reliable system for creating liquefied natural gas that is substantially free of acid gases. The methane produced in the upper distillation zone meets most specifications for pipeline delivery. For example, the methane can meet a pipeline $CO_2$ specification of less than 2 mol. percent, as well as a 4 ppm $H_2S$ specification, if sufficient reflux is generated and/or there are enough stages of separation from packing or trays in the upper distillation zone 110.

The above acid gas removal system described in connection with FIG. 1 is profitable for producing a commercial methane product 16 that is substantially free of acid gases. The product 16 is preferably a gas and sent down a pipeline for sale. The gas product preferably meets a pipeline $CO_2$ specification of 1 to 4 mol. percent, where sufficient reflux is generated. At the same time, carbon dioxide and hydrogen sulfide are substantially removed through a bottom stream 26.

It is noted that some methane may also be inevitably entrained in the bottom acid gas stream 22. The column 100 of FIG. 1 does include a reboiler 160 as discussed above. The reboiler 160 provides reboiled vapor to the bottom of the stripping trays. The reboiled vapor will include methane that is reintroduced into the column 100 through line 27. However, it is desirable to recapture more methane than can be captured using the reboiler 160, and then deliver the recaptured methane directly into the freezing zone 108. Further, it is desirable to reduce the size and weight of the column 100 by substantially reducing the size of the lower distillation zone 106, or even removing it altogether.

Figure 2:
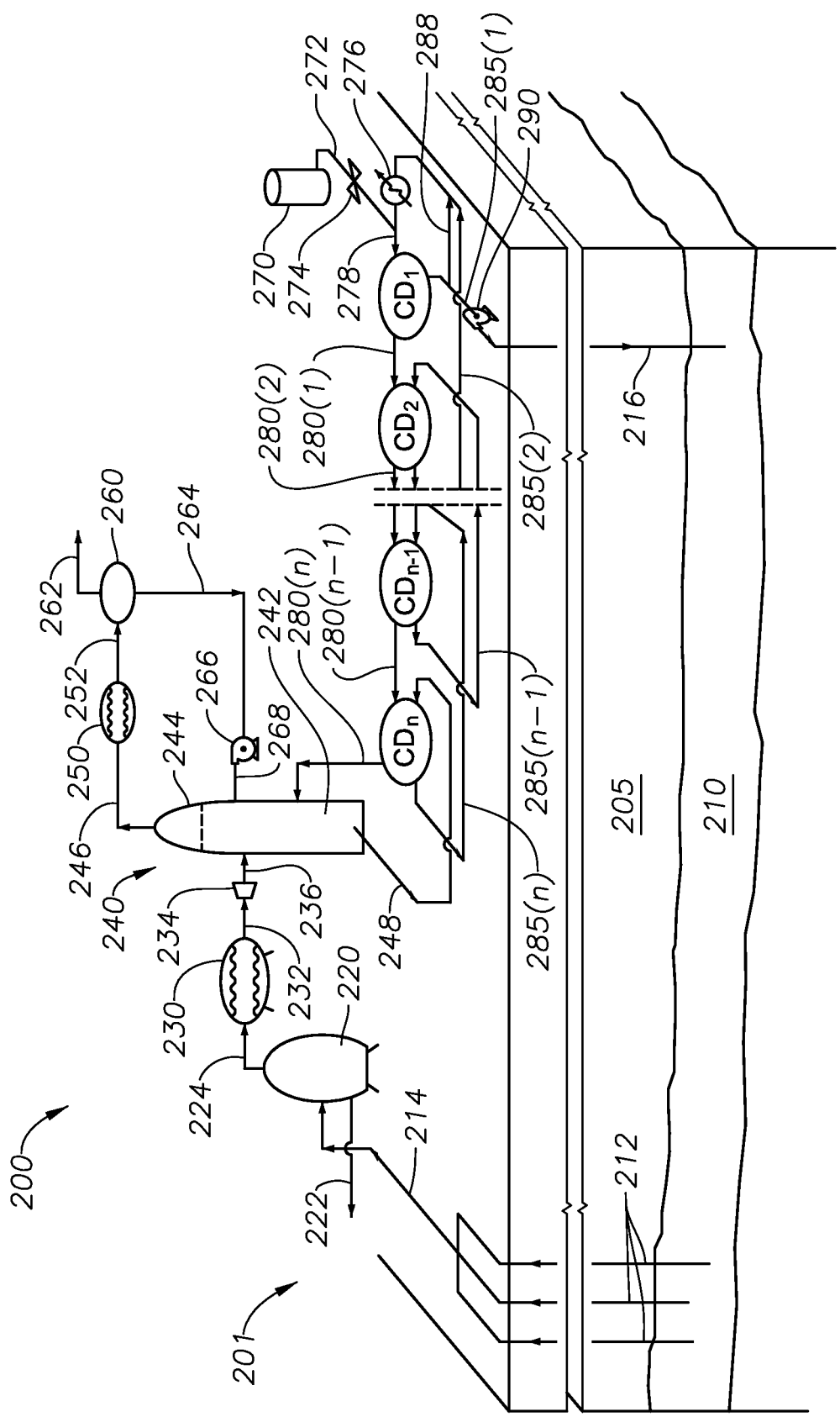
FIG. 2 is a schematic diagram showing a gas processing facility for removing acid gases from a gas stream in accordance with the present invention, in one embodiment. The gas processing facility employs a series of co-current contactors for recapturing methane from the bottom acid gas stream.

FIG. 2 is a schematic diagram showing a gas processing facility 200 for removing acid gases from a gas stream in accordance with the present invention, in one embodiment. The gas processing facility 200 is placed at or near a hydrocarbon development area 201. The hydrocarbon development area 201 may represent any location where gaseous hydrocarbons are produced. The development area 201 may be onshore, near shore, or offshore. The development area 201 may be operating from original reservoir pressure or may be undergoing enhanced recovery procedures. The systems and methods claimed herein are not limited to the type of field that is under development so long as it is producing hydrocarbons, including methane, contaminated with carbon dioxide.

In either respect, a plurality of production wells 212 is shown at the hydrocarbon development area 201. The production wells 212 extend through a subsurface region 205, and into a selected formation 210 In the illustrative development area 201 of FIG. 2, three production wells 212 are shown. However, it is understood that the hydrocarbon development area 201 may include many more production wells.

Production through the production wells 212 is preferably merged at a subsurface flow-line 214. The flow-line 214 contains a raw gas stream. The gas stream is "raw," meaning that it has not yet undergone any treatment to remove water or acid gases. The raw gas stream in flow-line 214 contains primarily hydrocarbon fluids in a vapor phase. The hydrocarbons are primarily methane, but may also include ethane and even other heavy hydrocarbons such as trace amounts of propane or butane, and even aromatic hydrocarbons.

The raw gas stream may also include trace amounts of nitrogen, helium and other inert gases. The raw gas stream will further include at least some brine or other aqueous fluid. Finally, the raw gas stream will include carbon dioxide and, possibly, other acid gases.

The raw gas stream travels through the flow-line 214, and is introduced into a dehydration vessel 220. The dehydration vessel 220 may be, for example, a glycol dehydration vessel that uses a glycol-based chemical. A glycol-based process such as the so-called DRIZO process wherein benzene is used as a stripping agent may be employed. In some cases, the raw gas from flow-line 214 may be mixed with mono-ethylene glycol (MEG) in order to prevent water drop-out and hydrate formation. The MEG may be sprayed on a chiller, for example, and the liquids collected for separation into water, more concentrated MEG, and possibly some heavy hydrocarbons, depending on the temperature of the chiller and the inlet gas composition. Alternatively, the dehydration vessel 220 may use a mole sieve.

As a result of passing the raw gas from flow-line 214 through the dehydration vessel 220, an aqueous stream 222 is generated. The aqueous stream 222 may be sent to a water treatment facility (not shown). Alternatively, the aqueous stream 222 may be re-injected into the subsurface formation 210. Alternatively still, the removed aqueous stream 222 may be treated to meet environmental standards and then released into the local watershed or the offshore environment as treated water.

Also, as a result of passing the raw gas stream through the dehydration vessel 220, a substantially dehydrated gas stream 224 is produced. In connection with the present systems and methods, the dehydrated gas stream 224 includes carbon dioxide and, perhaps, small amounts of hydrogen sulfide. The gas stream 224 may also contain other sulfurous components such as carbonyl sulfide, carbon disulfide, sulfur dioxide, and various mercaptans.

The dehydrated gas stream 224 is passed through a preliminary heat exchanger 230. The heat exchanger 230 will include a refrigeration unit. The heat exchanger 230 chills the dehydrated gas stream 224 down to a temperature of about −30° F. to −40° F. The heat exchanger 230 may be, for example, an air cooler or an ethylene or propane refrigerator.

A cooled sour gas stream is released from the heat exchanger 230. This is shown at line 232. The cooled sour gas stream is optionally taken through an expansion device 234. The expansion device 234 may be, for example, a Joule-Thompson ("J-T") valve. The expansion device 234 serves as an expander to obtain further cooling of the dehydrated gas stream 232. A final cooled sour gas stream 236 is thus generated. The final cooled sour gas stream 236 may be at a temperature of about −40° F. to −70° F.

It is understood that the cooling arrangement shown for the gas processing facility 200 is merely illustrative. Other cooling arrangements, such as the one shown in FIG. 1, may be used. The present inventions are not limited by the manner of generating a cooled sour gas stream 236. However, it is preferred that at least partial liquefaction of the sour gas stream 236 is accomplished.

It is desirable to remove the carbon dioxide (and any sulfurous components) from the cooled sour gas stream 236. In accordance with the gas processing facility 200, a cryogenic distillation tower 240 is provided. The tower 240 may be a trayed tower, a packed tower, or other type of tower, so long as it operates to "freeze" carbon dioxide and other acidic components out of methane gas vapor as solids.

The dehydrated and cooled sour gas stream 236 enters the distillation tower 240. The chilled sour gas of line 236 enters the tower 200 at about 500 to 600 psig. The distillation tower 240 has a freezing zone 242. This may be in accordance with the intermediate controlled freezing zone, or "spray section" 108, of FIG. 1. The distillation tower 200 also includes an upper distillation zone 244. This may be in accordance with the upper distillation zone, or "rectification section" 110 of FIG. 1.

The distillation tower 100 operates to separate methane (and some ethane) from carbon dioxide (and other acid gas components). The methane gas is released through the upper distillation zone 244 as an overhead gas stream 246, while the carbon dioxide is released through the bottom of the distillation tower 100 as a bottom acid gas stream 248.

The overhead gas stream 246 is preferably taken through further cooling. In the arrangement of FIG. 2, the overhead gas stream 246 is directed through a heat exchanger 250. The heat exchanger 250 includes a refrigeration unit for causing liquefaction of the methane gas. In one aspect, the heat exchanger 250 uses an ethylene refrigerant or other refrigerant capable of chilling the overhead methane stream 246 down to about −135° F. to −145° F. An expander valve (not shown) may also be used in series with the heat exchanger 250 to achieve a temperature necessary for liquefaction. In either event, a liquefied natural gas (LNG) stream is produced at line 252.

The gas processing facility 200 also includes a separator 260. The separator releases cold natural gas from overhead line 262. The natural gas in line 262 is the commercial product that is delivered downstream for sale. Optionally, a portion of the natural gas product may be captured as fuel gas for an on-sight or near-sight gas processing facility.

The separator 260 also captures liquefied natural gas from line 252, and directs it back to the distillation tower 200 as "reflux". A reflux line is seen at 264. A pressure boosting pump 266 may be used to assist in injecting the reflux from line 264 into the distillation tower 200. In the arrangement of FIG. 2, the reflux is injected into the top of the freezing zone (shown as 108 in FIG. 1). However, the reflux in line 264 may be injected into the distillation zone 244 as is provided in the tower 100 of FIG. 1

The reflux from line 264 is directed into the freezing zone 242 as a cold liquid spray. Spray headers (such as spray headers 120 of FIG. 1) may be used. As discussed above, the cold liquid spray helps to precipitate any upward-moving carbon dioxide within the distillation tower 200.

Carbon dioxide and other acid gases precipitate downward towards the bottom of the freezing zone 242. A melt tray (not shown) may be used to capture solids and direct them out of the bottom of the freezing zone 242. The temperature in the distillation tower 240 at the bottom of the freezing zone 242 may be about −50° F. to −100° F. However, in accordance with the present systems, no lower distillation zone (such as lower distillation zone 106 of FIG. 1) is required. The operator may choose to have a very small lower distillation zone, but this is not necessary for capturing methane gas entrained with the solid or liquid acid gases.

The acid gas components exit the tower 240 as a bottom acid gas stream 248. The bottom acid gas stream 284 represents a cold slurry that primarily contains carbon dioxide. It may also contain about 5% $H_2S$ and other sulfurous components. It will also contain about 1% to 5% methane and ethane, which ideally is recaptured.

In order to recapture hydrocarbon gases from the bottom liquefied acid gas stream 248, the gas processing facility 200 employs a series of co-flowing contacting devices $CD_1$, $CD_2$, ..., $CD_{(n-1)}$, $CD_n$. These devices are used to contact the bottom liquefied acid gas stream 248 with a stripping gas.

The co-current contacting devices $CD_1$, $CD_2$, ..., $CD_{(n-1)}$, $CD_n$ may be any of a variety of short contact-time mixing devices. Examples include static mixers, centrifugal mixers, and demisters. Some mixing equipment breaks the liquid apart through an eductor. The eductor delivers gas through a venture-like tube that in turn pulls liquid into the tube. Because of the venturi effect, the liquid is dragged in and broken into smaller particles, allowing a large surface area of contact with the gas.

The stripping gas is preferably substantially pure carbon dioxide. A tank or reservoir of carbon dioxide is seen at 270. To feed the contacting devices $CD_1$, $CD_2$, ..., $CD_{(n-1)}$, $CD_n$, a $CO_2$ line is provided at line 272 from the tank 270. Flow of $CO_2$ through the line 272 is regulated by a valve 274. Once the system 200 is operational, the valve 274 is substantially closed. Alternatively, the stripping gas is provided by boiling a portion of the stripped liquefied bottoms stream.

In operation, $CO_2$ is introduced into the first contacting device $CD_1$ as a stripping gas. The $CO_2$ moves through each contacting device $CD_1$, $CD_2$, ..., $CD_{(n-1)}$, $CD_n$, in series for the removal of residual methane from the liquid. As the stripping gas moves through the contacting devices $CD_1$, $CD_2$, ..., $CD_{(n-1)}$, $CD_n$, the stripping gas becomes progressively closer to the distillation tower 200, and the operating temperature will go down. In addition, as the stripping gas moves through the contacting devices $CD_1$, $CD_2$, ..., $CD_{(n-1)}$, $CD_n$, the gas in the contacting devices becomes progressively enriched with methane as it is stripped out of the liquefied acid gas.

The first contactor $CD_1$ releases a first partially-methane-enriched gas stream 280(1) to the second contactor $CD_2$. The first partially-methane-enriched gas stream 280(1) may be, for example, at about 20° F. to 30° F., and about 400 to 500 psig. The second contactor $CD_2$ releases a second partially-methane-enriched gas stream 280(2). This may be at, for example, about 10° F. to 20° F., and about 400 to 450 psig. A next-to-last contactor $CD_{(n-1)}$ releases a next partially-methane-enriched gas stream 280(n−1) to the final contactor $CD_n$, and a final contactor $CD_n$ releases a final methane-enriched gas stream 280(n). The final enriched gas stream 280(n) may be at, for example, about −70° F. and 400 psig.

The final methane-enriched gas stream 280(n) is comprised of methane and $CO_2$. The methane and $CO_2$ are reintroduced into the freezing zone 242 of the distillation tower. The recaptured methane then passes upward through the upper distillation section 244, and ultimately becomes a part of the overhead gas stream 246.

Referring again to the bottom acid gas stream 248, the bottom liquefied gas steam 248 is carried into the final contactor $CD_n$. The liquefied acid gas stream 248 moves through each contacting device $CD_n$, $CD_{(n-1)}$, ..., $CD_2$, $CD_1$. As the liquefied acid gas moves through the contacting devices $CD_n$, $CD_{(n-1)}$, ..., $CD_2$, $CD_1$ in series, the $CO_2$ gas content in the liquid becomes progressively richer. Thus, the final contactor $CD_n$ releases a first partially-stripped acid gas liquid 285(n) to the previous co-current contactor $CD_{(n-1)}$, the previous co-current contactor $CD_{(n-1)}$ releases a next partially-stripped acid gas liquid 285(n−1), the second co-current contactor $CD_2$ releases a second partially-stripped acid gas liquid 285(2), and the first contactor $CD_1$ releases a final stripped acid gas liquid 285(1).

It is preferred that the second partially-stripped acid gas liquid 285(2) released by the second contactor $CD_2$ be warmed. To this end, a reboiler 276 is provided. The reboiler 276 may warm the second partially-stripped acid gas liquid 285(2) to a temperature of, for example, 30° F. to 40° F. This aids in breaking out methane in the first contactor $CD_1$.

The final stripped acid gas liquid 285(1) represents a solution that is comprised substantially of carbon dioxide, plus any sulfurous components from the original raw gas stream in flow-line 214. The final stripped acid gas liquid 285(1) may be delivered to one or more acid gas injection wells 216. The final stripped acid gas liquid 285(1) may then be either sequestered, or possibly used to maintain reservoir pressure in the subsurface formation 210. To facilitate injection, a pump 290 is used.

Since the final stripped acid gas liquid 285(1) represents a substantially pure $CO_2$ stream, a portion of the final stripped acid gas liquid 285(1) may be diverted and re-used as the stripping gas. In the arrangement of FIG. 2, a diversion line 288 is provided. The $CO_2$-rich liquid in line 288 is merged with the second partially-striped acid gas liquid 285(2) before the second partially-stripped acid gas liquid 285(2) enters the heater 276 (which in function is a reboiler). Alternatively, the $CO_2$-rich liquid in line 288 may be directed into line 278.

It is noted that in each co-current contacting device, the flow of acid gas and stripping gas is parallel, that is, along a longitudinal axis of the respective contactors. This allows the co-current contacting devices $CD_1$, $CD_2$, ..., $CD_{(n-1)}$, $CD_n$ to operate at much higher fluid velocities than counter-current contactors. As a result, co-current flow contactors tend to be smaller than counter-current flow contactors that utilize packed or trayed towers.

One preferred contacting device is the ProsCon™ contactor. This contactor utilizes an eductor followed by a centrifugal coalesce. The centrifugal coalescer induces large centrifugal forces to re-integrate the liquid solvent in a small volume. It is believed that the ProsCon™ contactor has been used in pharmaceutical applications, but has not yet been used in a gas processing and separation facility. Alternatively, it is believed that the ProScav™ separator available from ProPure of Bergen, Norway may serve as an acceptable co-current contactor. Marketing information presently available on-line states that the ProScav™ contactor is used to inject an $H_2S$ scavenger for the removal of $H_2S$. The ProcScav™ contactor appears to operate as a static mixer followed by a coalescer. In whatever embodiment, compact vessel technology is employed, allowing for a reduction of the hardware in comparison to the large contactor towers, and further allowing for the substantial removal of the lower distillation zone of a cryogenic distillation tower.

In one aspect, a combination of a mixing device and a corresponding coalescing device is employed in the contactors. Thus, for example, the first contactor $CD_1$ and second contactor $CD_2$ may utilize static mixers as their mixing devices, a third contactor (not shown) or other contactors may utilize eductors, and the next-to-last contactor $CD_{(n-1)}$ and $CD_n$ contactor may utilize centrifugal mixers.

In the arrangement of FIG. 2, four co-current contacting devices $CD_1$, $CD_2$, ..., $CD_{(n-1)}$, $CD_n$ are shown. However, a fewer or greater number of co-current contacting devices may be employed. In a general sense, a first co-current contactor is configured to:
  receive the stripping gas;
  receive a second partially-stripped acid gas liquid from a next-to-last (or second) co-current contactor;
  release the final stripped acid gas liquid; and
  release a first partially-methane-enriched gas stream to the next-to-last (or second) co-current contactor.

In addition, a final co-current contactor is configured to:
  receive the bottom liquefied acid gas stream;
  receive a partially-methane-enriched gas stream from a previous co-current contactor;
  release the final methane-enriched gas stream to the cryogenic distillation tower; and
  release a first partially-stripped acid gas liquid to the previous co-current contactor.

The number of contacting devices (at least one) prior to the final contactor $CD_n$ is dictated primarily by the level of methane removal needed to meet the desired standard, such as less than 1% methane in the final stripped acid gas liquid 285(1). For example, the system 200 may have two co-current contactors for processing the bottom acid gas stream 248. In this instance, the final co-current contactor $CD_n$ is the second co-current contactor, while the previous co-current contactor is the first co-current contactor $CD_1$.

Alternatively, the system 200 may have three co-current contactors for processing the bottom acid gas stream 248. In this instance, the previous co-current contactor is the second co-current contactor. The second co-current contactor is then configured to receive the first partially-methane-enriched gas stream from the first co-current contactor $CD_1$, and the first partially-stripped acid gas liquid from the final co-current contactor $CD_n$. Further, the second co-current contactor releases a second partially-methane-enriched gas stream to the final co-current contactor $CD_n$, and a second partially-stripped acid gas liquid into the first co-current contactor $CD_1$.

Alternatively, the system 200 may have more than three co-current contactors for processing the bottom acid gas stream 248. The final co-current contactor $CD_n$, any intermediate co-contactors, the second co-current contactor $CD_2$, and the first co-current contactor $CD_1$ are arranged to deliver respective stripped acid gas liquids as progressively richer acid gas liquids in series. At the same time, the first co-current contactor $CD_1$, the second co-current contactor $CD_2$, any intermediate co-contactors, and the final co-current contactor $CD_n$ are arranged to deliver the respective methane-enriched gas streams as progressively sweetened gas stream in series.

The use of multiple, co-current contacting devices may also be used to recapture any carbon dioxide that escapes from a cryogenic distillation tower with the overhead gas stream. FIG. 3 provides a schematic diagram showing a gas processing facility 300 for removing acid gases from a gas stream in accordance with the present invention, in an alternate embodiment. The gas processing facility 300 employs a series of co-current contactors for further sweetening methane from the overhead gas stream.

As with gas processing facility 200, the gas processing facility 300 is placed at or near a hydrocarbon development area 301. The hydrocarbon development area 301 may again represent any location where gaseous hydrocarbons are produced. The development area 301 may be onshore, near shore, or offshore. The systems claimed herein are not limited to the type of field that is under development so long as it is producing hydrocarbons, including methane, containing carbon dioxide.

A plurality of production wells 312 are shown at the hydrocarbon development area 301. The production wells 312 extend through a subsurface region 305, and into a selected formation 310. In the illustrative development area 301 of FIG. 3, three production wells 312 are once again shown. However, it is understood that the hydrocarbon development area 301 may include many more production wells.

Production through the production wells 312 is preferably merged at a subsurface flow-line 314. The flow-line 314 contains a raw gas stream. The raw gas stream in the flow-line 314 contains primarily hydrocarbon fluids in a vapor phase. The hydrocarbons are primarily methane, but may also include ethane and even other heavy hydrocarbons such as trace amounts of propane or butane, and even aromatic hydrocarbons.

The raw gas stream may also include trace amounts of nitrogen, helium, and other inert gases. The raw gas stream will further include at least some brine or other aqueous fluid. Finally, the raw gas stream will include carbon dioxide and, possibly, other acid gases.

The raw gas stream travels through the flow-line 314, and is introduced into a dehydration vessel 320. The dehydration vessel 320 may be in accordance with dehydration vessel 220 from FIG. 2. As a result of passing the raw gas from flow-line 314 through the dehydration vessel 320, an aqueous stream 322 is once again generated. The aqueous stream 322 may be sent to a water treatment facility (not shown). Alternatively, the aqueous stream 322 may be re-injected into the subsurface formation 310. Alternatively still, the removed aqueous stream 322 may be treated to meet environmental standards and then released into the local watershed or, if applicable, the offshore environment as treated water.

Also, as a result of passing the raw gas stream through the dehydration vessel 320, a substantially dehydrated gas stream 324 is produced. In connection with the present systems, the dehydrated gas stream 324 includes carbon dioxide and, perhaps, small amounts of hydrogen sulfide. The gas stream 324 may also contain other sulfurous components such as carbonyl sulfide, carbonyl disulfide, sulfur dioxide, and various mercaptans.

The dehydrated gas stream 324 is passed through a preliminary heat exchanger 330. The heat exchanger 330 will include a refrigeration unit. The heat exchanger 330 chills the dehydrated gas stream 324 down to a temperature of about −30° F. to −40° F. The heat exchanger 330 may be, for example, an air cooler or an ethylene or propane refrigerator.

A cooled sour gas stream is released from the heat exchanger 330. This is shown at line 332. The cooled sour gas stream is optionally taken through an expansion device 334. The expansion device 334 may be, for example, a Joule-Thompson ("J-T") valve. The expansion device 334 serves as an expander to obtain further cooling of the dehydrated gas stream 332. A final cooled sour gas stream 336 is thus generated. The final cooled sour gas stream 336 may be at a temperature of about −40° F. to −70° F.

It is understood that the cooling arrangement shown for the gas processing facility 300 is merely illustrative. Other cooling arrangements, such as that shown in FIG. 1, may be used. The facility 300 is not limited by the manner of generating a cooled sour gas stream 336. However, it is preferred that at least partial liquefaction of the sour gas stream 336 is accomplished.

It is once again desirable to remove the carbon dioxide (and any sulfurous components) from the cooled sour gas stream 336. In accordance with the gas processing facility 300, a cryogenic distillation tower 340 is provided. The tower 340 may be a trayed tower, a packed tower, or other type of tower, so long as it operates to "freeze" carbon dioxide and other acidic components out of methane gas vapor as solids.

The dehydrated and cooled sour gas stream 336 enters the distillation tower 340. The chilled sour gas of line 336 enters the tower 340 at about 500 to 600 psig. The distillation tower 340 has a freezing zone 342. This may be in accordance with the intermediate controlled freezing zone, or "spray section" 108, of FIG. 1. The distillation tower 340 also includes an upper distillation zone 344. This may be in accordance with the upper distillation zone or "rectification section" 110 of FIG. 1. Finally, the distillation tower 340 includes a lower distillation zone 341. This may be in accordance with the lower distillation zone, or "stripping section" 106 of FIG. 1

The distillation tower 340 operates to separate methane (and some ethane) from carbon dioxide (and other acid gas components). The methane gas is released through the upper distillation zone 344 as an overhead gas stream 346, while the carbon dioxide is released through the lower distillation zone 341 as a bottom liquefied acid gas stream 348.

Within the distillation tower 340, carbon dioxide and other acid gases precipitate downward towards the lower distillation zone 341. A melt tray (not shown) may be used to capture solids and direct them into weirs and trays. This enables the melting of solid acidic components, and the break-out of methane gas. The temperature in the distillation tower 340 at the bottom of the lower distillation zone 341 may be about 0° F. to 20° F. The bottom acid gas stream 348 is released from the lower distillation zone 341 as a liquid stream.

The bottom acid gas stream 348 is preferably taken through a reboiler 350. The liquid acid gas stream entering the reboiler 350 is at a relatively low temperature, for example, about 30° F. to 40° F. Reboiler 350 is in accordance with reboiler 160 of FIG. 1. The reboiler 350 allows methane gas entrained in the bottom acid gas stream 348 to flash from the liquid acid gases. The methane vapor (along with vaporized $CO_2$) then travels through vapor line 352, and returns to the distillation tower 340. Preferably, the vapor line 352 delivers the methane-containing vapor into the intermediate freezing zone 342. Alternatively, the vapor line 352 may deliver the methane vapor to the stripping trays (such as weirs and cascading trays 126 in FIG. 1) in the lower distillation zone 341.

Carbon dioxide and any other trace acidic components exit the reboiler 350 primarily as a liquid stream. This is shown at line 354. The liquid acidic components are optionally directed through an expansion device 356 for further cooling. This decreases the temperature of the liquid stream in line 354. A chilled liquid stream 358 is thus released. The $CO_2$-rich liquid stream 358 may be pumped downhole through one or more AGI wells. In the arrangement of FIG. 3, the chilled liquid $CO_2$ is injected into the subsurface formation 310 through injection wells 316 as part of an enhanced oil recovery process.

As noted, the distillation tower also releases an overhead gas stream 346. The overhead gas stream 346 is comprised primarily of methane. The overhead gas stream 346 will preferably comprise no more than about 2 mol. percent carbon dioxide. At this percentage, the overhead gas stream 346 may be used as fuel gas or may be sold into certain markets as natural gas. However, in accordance with certain methods herein, it is desirable that the overhead gas stream 346 undergo further processing. More specifically, it is desirable to drive down the amount of carbon dioxide in the overhead gas stream 346.

In order to recapture carbon dioxide in the overhead gas stream 346, the gas processing facility 300 employs a series of co-flowing contacting devices $CD_1$, $CD_2$, ..., $CD_{(n-1)}$, $CD_n$. These devices are used to contact the overhead gas stream 346 with a refluxing liquid.

The refluxing liquid is preferably substantially pure methane. A start-up tank or reservoir of methane is seen at 370. To feed the contacting devices $CD_1$, $CD_2$, ..., $CD_{(n-1)}$, $CD_n$, a $CH_4$ line is provide at line 372 from the tank 370. Flow of $CH_4$ through the line 372 is regulated by a valve 374. Once the system is operational, the valve 374 is substantially closed.

The co-current contacting devices $CD_1$, $CD_2$, ..., $CD_{(n-1)}$, $CD_n$ may again be any of a variety of short contact-time mixing devices. Examples include static mixes and centrifugal mixers. In operation, substantially pure methane is introduced into a final contacting device $CD_n$ as a liquid. The methane first moves through line 372, and is then directed into a chilling unit 360. Preferably, the chilling unit 360 is an ethylene cooler. The chilling unit 360 brings the temperature of the product gas down to about −130° F. to −145° F. The chilling unit 360 releases a chilled methane ($CH_4$) liquid stream through line 362. A pump 364 is preferably provided along line 362 to increase operating pressure.

Chilled liquid $CH_4$ moves through each contacting device $CD_n$, $CD_{(n-1)}$, . . . , $CD_2$, $CD_1$ in series for the removal of acidic components from the gas. As the methane-rich gas moves through the contacting devices $CD_1$, $CD_2$, . . . , $CD_{(n-1)}$, $CD_n$, the acid gas content in the gas becomes progressively leaner. Thus, the final contactor $CD_n$ releases a first partially-$CO_2$-enriched liquid 385(1) to the previous contactor $CD_{(n-1)}$. The first partially-$CO_2$-enriched liquid 385(1) will still have a very low acidic component, such as less than 1% $CO_2$ and less than 10 ppm $H_2S$.

A next-to-last contactor $CD_{(n-1)}$ releases a next-to-last partially-$CO_2$-enriched liquid 385(n−1); a second contactor $CD_2$ releases a second partially-$CO_2$-enriched liquid 385(2) to the first contactor $CD_1$; and a first contactor $CD_1$ releases a $CO_2$-enriched liquid 385(1). Thus, moving close to the distillation tower 300, the acidic components in the reflux liquids will increase.

The final reflux liquid 385(1) represents a solution that is comprised substantially of methane and carbon dioxide, plus some of the sulfurous components from the original raw gas stream in flow-line 314. The final reflux liquid 385(1) is returned to the distillation tower 300. More specifically, the final reflux liquid 385(1) is injected into the upper distillation zone 344. Preferably, the final reflux liquid 385(1) passes through a pump 382 to increase line pressure. A pressurized reflux stream 383 enters the upper distillation zone 344.

Two things are noted here about the final reflux liquid 385(1). First, the percentage of acidic components in the reflux liquid is very small. Depending on the percentage of carbon dioxide in the original raw gas stream 314, the degree of pre-chilling applied to the dehydrated sour gas stream 324, the pressure in the distillation tower 340, the number of co-current contacting devices used, and other factors, the carbon dioxide composition in the final reflux liquid 385(1) will likely be less than 5 mol. percent, and possibly less than 2 mol. percent.

Second, the final reflux liquid 385(1) becomes a part of the cold spray used in the freezing zone 342. The final reflux liquid 385(1) may be injected directly into the freezing zone 342. However, in the arrangement for the gas processing facility 300 shown in FIG. 3, a portion of the final reflux liquid 385(1) is captured from stripping trays (such as weirs and trays 116 shown in FIG. 1) residing near the top of the distillation tower 340 in the upper distillation zone 344. Line 384 shows a portion of a liquid stream containing methane and $CO_2$. The liquid line 384 delivers the methane and $CO_2$ mixture to a reflux drum 381. The reflux drum 381 provides surge capacity for a pump 387. The pump 387 delivers the methane and $CO_2$ liquid stream into the freezing zone 342 as a cold liquid spray, such as through spray nozzles. As discussed above, the cold liquid spray helps to precipitate any upward-moving carbon dioxide within the distillation tower 300. Line 388 is shown delivering the methane and $CO_2$ liquid stream into the freezing zone 342.

Referring again to the overhead gas stream 346, the overhead gas stream 346 is carried into the first contactor $CD_1$. The overhead gas stream 346 moves through each contacting device $CD_1$, $CD_2$, . . . , $CD_{(n-1)}$, $CD_n$. As the overhead gas moves through the contacting devices $CD_1$, $CD_2$, . . . , $CD_{(n-1)}$, $CD_n$ in series, the gas content in the contacting devices becomes progressively sweeter. Thus, the first contactor $CD_1$ releases a first partially-sweetened methane gas stream 380(1) to the second co-current contactor $CD_2$; the second co-current contactor $CD_2$ releases a second partially-sweetened gas stream to a next-to-last co-current contactor $CD_{(n-1)}$; and the next-to-last co-current contactor $CD_{(n-1)}$ releases a final partially-sweetened methane gas stream 380(n−1). The final co-current contactor $CD_n$ releases a final sweetened methane gas stream 380(n).

The final sweetened gas stream 380(n) is comprised substantially of methane and may be taken as the product gas. In FIG. 3, it can be seen that a part of the final methane gas stream 380(n) is diverted into line 361. The diverted methane in line 361 is taken through the chilling unit 360. Chilled liquid methane is then reintroduced to the final contactor $CD_n$ in line 362.

The majority of the final sweetened gas stream 380(n) may be sold as a commercial product. Preferably, some of the final sweetened gas stream 380(n) is directed through a heat exchanger 390 for re-cooling. A portion of the final sweetened gas stream 380(n) is released from the heat exchanger 390 as the commercial product (LNG, after pressure let-down). Preferably, the heat exchanger 390 is capable of chilling the final sweetened methane stream 380(n) down to about −135° F. to −145° F. as the final product 392. In one or more embodiments, heat exchangers 360 and 390 could be one and the same, with the liquid generated going to a collection vessel. The liquid could then be split between reflux and commercial product. This alternative embodiments may be a more capital-efficient process.

The heat exchanger 390 preferably uses ethylene as a refrigerant. An ethylene loop is seen at line 394. The ethylene is condensed against propane in a chiller 396. Preferably, a compressor (not shown) is placed along line 394 to move ethylene through the chiller 396. The ethylene in line 394 passes through chiller 396 for cooling, and then preferably moves through a Joule-Thompson valve 398 for further cooling. The ethylene in line 394 leaves the J-T valve 398 at a temperature of about −140° F.

A propane loop is provided at line 391. Propane is taken from the chiller 396 and moved through a compressor 393. This will cause an increase in pressure and temperature in the propane in line 391. Accordingly, the propane is taken through an aerial cooler 395 to bring the temperature of the propane down to about an ambient temperature. A cooled propane stream is released through line 397. The propane may be expanded through a Joule-Thompson valve 399 or a turbo-expander in order to bring the temperature of the propane in line 397 down to about −40° F.

The illustrative refrigeration system of FIG. 3 with the heat exchanger 390 is considered to be a closed-loop system, meaning that an external working fluid such as propane or ethylene is used as a coolant to chill the final sweetened gas stream 380(n). However, it is understood that the inventions herein are not limited by the manner in which the final sweetened gas stream 380(n) is cooled. For example, an open-loop system may be employed wherein a portion of the overhead methane stream 346 itself is ultimately used as the working fluid. In some cases, the product gas will not be chilled, but actually warmed, then sent to a pipeline for sale as a gaseous product. In this case, it is desirable to capture the cold energy from the gas stream 380(n).

It is also noted that in each co-current contacting device, the flow of methane gas and stripping liquid is parallel, that is, along a longitudinal axis of the respective contactors. This allows the co-current contacting devices $CD_1$, $CD_2$, . . . , $CD_{(n-1)}$, $CD_n$ to operate at much higher fluid velocities than counter-current contactors. As a result, co-current flow contactors tend to be smaller than counter-current flow contactors that utilize packed or trayed towers. The co-current contacting devices of FIG. 3 may be designed in accordance with the co-current contacting devices of FIG. 2. In this respect, for example, the co-current contacting devices of FIG. 3 may each be a ProsCon™ contactor.

In the arrangement of FIG. 3, four co-current contacting devices $CD_1$, $CD_2$, ..., $CD_{(n-1)}$, $CD_n$ are shown. However, a fewer or greater number of co-current contacting devices may be employed. In a general sense, a first co-current contactor is configured to:
  receive the overhead acid gas stream;
  receive a second partially-$CO_2$-enriched liquid reflux from a second co-current contactor;
  release a first partially-sweetened methane gas stream to the second co-current contactor; and
  release a final $CO_2$-enriched liquid reflux to the cryogenic distillation tower.

In addition, a final co-current contactor is configured to:
  receive the liquid reflux;
  receive a next-to-last partially sweetened methane gas stream from a next-to-last co-current contactor;
  release the final sweetened methane gas stream; and
  release a first partially-$CO_2$-enriched liquid reflux to the next-to-last co-current contactor.

The number of contacting devices used is dictated primarily by the level of $CO_2$ removal needed to meet the desired standard. For example, the system 300 may have two co-current contactors for processing the overhead gas stream 346. In this instance, the final co-current contactor $CD_n$ is the second co-current contactor, while the next-to-last co-current contactor is the first co-current contactor $CD_1$.

Alternatively, the system 300 may have three co-contactors for processing the overhead gas stream 346. In this instance, the next-to-last co-current contactor is the second co-current contactor. The second co-current contactor is then configured to receive the first partially-sweetened methane gas stream 380(1) from the first co-current contactor $CD_1$, and the first partially $CO_2$-enriched liquid 385(3) from the final co-current contactor $CD_n$. Further, the second co-current contactor releases a second partially-sweetened methane gas stream 380(2) to the final co-current contactor $CD_n$, and a second partially-$CO_2$-enriched liquid reflux 385(2) to the first co-current contactor $CD_1$.

Alternatively, the system 300 may have more than three co-current contactors for processing the overhead gas stream 346. The first co-current contactor $CD_1$, the second co-current contactor $CD_2$, any intermediate co-contactors, and the final co-current contactor $CD_n$ are arranged to deliver progressively sweeter methane gas streams, in series. At the same time, the final co-current contactor $CD_n$, any intermediate co-contactors, the second co-current contactor $CD_2$, and the first co-current contactor $CD_1$ are arranged to deliver the respective $CO_2$-enriched liquid reflux streams as progressively richer reflux streams in series.

It will be appreciated that FIGS. 2 and 3 represent simplified schematic diagrams intended to make clear only selected aspects of the gas processing systems 200 and 300. A gas processing system will usually include many additional components such as heaters, chillers, condensers, liquid pumps, gas compressors, blowers, other types of separation and/or fractionation equipment, valves, switches, controllers, along with pressure-, temperature-, level-, and flow-measuring devices. Of particular relevance in the present disclosure, booster pumps (not shown) may be needed between contactor stages, due to potentially high pressure drops at the eductors. Note also that the contactors should preferably be well-insulated for cryogenic service.

As an alternative to the systems 200 and 300 described above, a gas processing facility may utilize co-current contacting devices to process both the bottom acid gas stream (stream 248 of FIG. 2) and the overhead gas stream (stream 346 of FIG. 3). In this embodiment, the distillation tower would not need a lower distillation zone except to the extent to optionally house a melt tray. A benefit of using co-current contacting devices is that they reduce the size of the distillation tower. Further, they can be much smaller than typical distillation columns and internal components. Further still, they are not substantially affected by motion in the way that liquids on trays may be, which makes them suitable for offshore installations. Using co-current contacting devices on both the bottom acid gas stream 248 and the overhead gas stream 346 reduces the bulk of the distillation tower, reduces the loss of methane in the bottom acid gas stream 248, and increases the purity of the final LNG stream 394

Further embodiments A-BB are provided in the following paragraphs.

Embodiment A

A system for removing acid gases from a raw gas stream, comprising: (a) a dehydration vessel for receiving the raw gas stream, and separating the raw gas stream into a dehydrated raw gas stream and a stream comprised substantially of an aqueous fluid; (b) a heat exchanger for cooling the dehydrated raw gas stream, and releasing a cooled sour gas stream; (c) a cryogenic distillation tower that receives the cooled sour gas stream, and separates the cooled sour gas stream into (i) an overhead gas stream comprised primarily of methane, and (ii) a bottom liquefied acid gas stream comprised primarily of carbon dioxide; (d) a final co-current contactor configured to (i) receive the bottom liquefied acid gas stream, (ii) receive a partially-methane-enriched gas stream from a previous co-current contactor, (iii) release a final methane-enriched gas stream to the cryogenic distillation tower, and (iv) release a first partially-stripped acid gas liquid to the previous co-current contactor; and (e) a first co-current contactor configured to (i) receive a stripping gas, (ii) receive a second partially-stripped acid gas liquid from a second co-current contactor, (iii) release a final stripped acid gas liquid, and (iv) release a first partially-methane-enriched gas stream to the second co-current contactor.

Embodiment B

The system of Embodiment A, wherein the final stripped acid gas liquid comprises about 98 mol. percent or more acid gas.

Embodiment C

The system of Embodiment A or B, wherein a substantial portion of the final stripped acid gas liquid s injected into a subsurface formation through one or more acid gas injection wells.

Embodiment D

The system of any of Embodiments A-C, wherein a portion of the final stripped acid gas liquid is diverted and used as at least a portion of the stripping gas via reboiling.

Embodiment E

The system of any of Embodiments A-D, wherein: (a) the cryogenic distillation tower comprises a freezing zone; (b) the freezing zone receives the cold sour gas stream, a cold liquid spray comprised primarily of methane, and the final methane-enriched gas stream from the final co-current contacting device; and (c) the cryogenic distillation tower further comprises refrigeration equipment downstream of the cryogenic distillation tower for cooling the overhead methane stream and returning a portion of the overhead methane stream to the cryogenic distillation tower as the cold liquid spray.

Embodiment F

The system of Embodiment E, further comprising a melt tray below the freezing zone for receiving a cold slurry of acid gas particles, and delivering a substantially solids-free slurry to the final co-current contacting device as the bottom liquefied acid gas stream.

Embodiment G

The system of Embodiment E or F, wherein the bottom liquefied acid gas stream exits the cryogenic distillation tower at a temperature no greater than about −70° F.

Embodiment H

The system of any of Embodiments E-G, further comprising a lower distillation zone below the freezing zone for receiving a cold slurry of acid gas particles, at least partially melting the slurry of acid gas particles into a liquid stream, and delivering the liquid stream to the final co-current contacting device as the bottom liquefied acid gas stream.

Embodiment I

The system of any of Embodiments E-H, further comprising an upper distillation zone above the freezing zone for receiving vapor from the freezing zone and releasing the overhead gas stream.

Embodiment J

The system of any of Embodiments A-I, wherein the system comprises only two co-current contactors for processing the bottom acid gas stream such that: (a) the final co-current contactor is the second co-current contactor; (b) the previous co-current contactor is the first co-current contactor; (c) the first partially-methane-enriched gas stream released by the first co-current contactor is the partially methane-enriched gas stream received by the final co-current contactor; and (d) the first partially-stripped acid gas liquid released by the final co-current contactor is the second partially-stripped acid gas liquid received by the first co-current contactor.

Embodiment K

The system of any of Embodiments A-I, wherein the system comprises three co-current contactors for processing the bottom acid gas stream, such that: (a) the previous co-current contactor is the second co-current contactor; and (b) the second co-current contactor is configured to (i) receive the first partially-methane-enriched gas stream from the first co-current contactor, (ii) receive the first partially-stripped acid gas liquid from the final co-current contactor, (iii) release a second partially-methane-enriched gas stream into the final co-current contactor, and (iv) release the second partially-stripped acid gas liquid into the first co-current contactor.

Embodiment L

The system of any of Embodiments A-I, wherein the system comprises at least three co-current contactors for processing the bottom liquefied acid gas stream, such that: (a) the final co-current contactor, any intermediate co-contactors, the second co-current contactor and the first co-current contactor are arranged to deliver respective stripped acid gas liquids as progressively $CO_2$-richer acid gas liquids in series, and (b) the first co-current contactor, the second co-current contactor, any intermediate co-contactors, and the final co-current contactor are arranged to deliver the respective methane-enriched gas streams as progressively methane-enriched gas streams in series.

Embodiment M

A system for removing acid gases from a raw gas stream, comprising: (a) a dehydration vessel for receiving the raw gas stream, and separating the raw gas stream into a dehydrated raw gas stream and a stream comprised substantially of an aqueous fluid; (b) a heat exchanger for cooling the dehydrated raw gas stream, and releasing a cooled sour gas stream; (c) a cryogenic distillation tower that receives the cooled sour gas stream, and separates the cooled sour gas stream into (i) an overhead gas stream comprised primarily of methane, and (ii) a bottom liquefied acid gas stream comprised primarily of carbon dioxide; (d) a first co-current contactor configured to (i) receive the overhead gas stream, (ii) receive a second partially-$CO_2$-enriched reflux liquid from a second co-current contactor, (iii) release a first partially-sweetened methane gas stream to the second co-current contactor, and (iv) release a final $CO_2$-enriched reflux liquid to the cryogenic distillation tower; and (e) a final co-current contactor configured to (i) receive a reflux liquid, (ii) receive a next-to-last partially-sweetened methane gas stream from a next-to-last co-current contactor, (iii) release a first partially-$CO_2$-enriched reflux liquid to the next-to-last co-current contactor, and (iv) release a final sweetened methane gas stream.

Embodiment N

The system of Embodiment M, wherein the final sweetened methane gas stream comprises about 99 mol. percent or more methane.

Embodiment O

The system of Embodiment M or N, wherein a substantial portion of the final sweetened methane gas stream is delivered for liquefaction and sale.

Embodiment P

The system of any of Embodiments M-O, wherein a portion of the final sweetened methane gas stream is diverted and used as at least a portion of the reflux liquid during operation.

Embodiment Q

The system of any of Embodiments M-P, wherein: (a) the cryogenic distillation tower comprises a freezing zone; (b) the freezing zone receives the cooled sour gas stream and a cold liquid spray comprised primarily of methane; and (c) the cryogenic distillation tower further comprises refrigeration equipment downstream of the cryogenic distillation tower for cooling the final sweetened methane gas stream and returning a portion of the overhead methane stream to the cryogenic distillation tower as the cold spray.

Embodiment R

The system of Embodiment Q, wherein the cold spray comprises the final $CO_2$-enriched reflux liquid from the final co-current contactor.

Embodiment S

The system of Embodiment Q or R, further comprising a melt tray below the freezing zone for receiving a cold slurry of acid gas particles.

Embodiment T

The system of any of Embodiments Q-S, further comprising an upper distillation zone above the freezing zone for receiving vapor from the freezing zone and releasing the overhead gas stream.

Embodiment U

The system of any of Embodiments Q-T, wherein the system comprises only two co-current contactors for processing the overhead acid gas stream such that: (a) the final co-current contactor is the second co-current contactor; (b) the next-to-last co-current contactor is the first co-current contactor; (c) the first partially-sweetened methane gas stream released by the first co-current contactor is the partially sweetened methane gas stream received by the final co-current contactor; and (d) the second partially-$CO_2$-enriched reflux liquid received by the first co-current contactor is the partially-$CO_2$-enriched reflux liquid released by the final co-current contactor.

Embodiment V

The system of any of Embodiments Q-T, wherein the system comprises three co-current contactors for processing the overhead gas stream, such that: (a) the next-to-last co-current contactor is the second co-current contactor, and (b) the second co-current contactor is configured to (i) receive the first partially-sweetened methane gas stream from the first co-current contactor, (ii) receive the first partially-$CO_2$-enriched reflux liquid from the final co-current contactor, (iii) release a second partially-sweetened methane gas stream to the final co-current contactor, and (iv) release the second partially-$CO_2$-enriched reflux liquid to the first co-current contactor.

Embodiment W

The system of any of Embodiments Q-T, wherein the system comprises at least three co-current contactors for processing the overhead gas stream, such that: (a) the final co-current contactor, any intermediate co-contactors, the second co-current contactor and the first co-current contactor are arranged to deliver respective $CO_2$-enriched reflux liquids as progressively $CO_2$-richer reflux liquids in series; and (b) the first co-current contactor, the second co-current contactor, any intermediate co-contactors, and the final co-current contactor are arranged to deliver the respective sweetened gas streams as progressively sweetened gas streams in series.

Embodiment X

The system of any of Embodiments A-W, wherein the overhead gas stream comprises not only methane, but also helium, nitrogen, or combinations thereof.

Embodiment Y

A system for removing acid gases from a raw gas stream, comprising: (a) a dehydration vessel for receiving the raw gas stream, and separating the raw gas stream into a dehydrated raw gas stream and a stream comprised substantially of an aqueous fluid; (b) a heat exchanger for cooling the dehydrated raw gas stream, and releasing a cooled sour gas stream; (c) a cryogenic distillation tower that receives the cooled sour gas stream, and separates the cooled sour gas stream into (i) an overhead gas stream comprised primarily of methane, and (ii) a bottom acid gas stream comprised primarily of carbon dioxide; (d) a final lower co-current contactor configured to (i) receive the bottom liquefied acid gas stream, (ii) receive a partially-methane-enriched gas stream from a previous lower co-current contactor, (iii) release a final methane-enriched gas stream into the cryogenic distillation tower, and (iv) release a first partially-stripped acid gas liquid into the previous lower co-current contactor; (e) a first lower co-current contactor configured to (i) receive a stripping gas, (ii) release a second stripped acid gas liquid from a second lower co-current contactor, (iii) release a final stripped acid gas liquid, and (iv) release a first partially-methane-enriched gas stream to the second lower co-current contactor; (f) a first upper co-current contactor configured to (i) receive the overhead gas stream, (ii) receive a second partially-$CO_2$-enriched reflux liquid from a second co-current contactor, (iii) release a first partially-sweetened methane gas stream to the second co-current contactor, and (iv) release a final $CO_2$-enriched reflux liquid to the cryogenic distillation tower; and (g) a final upper co-current contactor configured to (i) receive a reflux liquid, (ii) receive a next-to-last partially-sweetened methane gas stream from a next-to-last co-current contactor, (iii) release a first partially-$CO_2$-enriched reflux liquid to the next-to-last co-current contactor, and (iv) release a final sweetened methane gas stream.

Embodiment Z

The system of Embodiment Y, wherein the bottom liquefied acid gas stream exits the cryogenic distillation tower at a temperature no greater than about −70° F.

Embodiment AA

The system of Embodiment Y or Z, wherein the cryogenic distillation tower is a bulk fractionation tower.

Embodiment BB

The system of any of Embodiments Y-AA, wherein the cryogenic distillation tower comprise a freezing zone that receives (i) the cooled sour gas stream, (ii) a cold liquid spray comprised primarily of methane, and (iii) the final methane-enriched gas stream from the final lower co-current contacting device.

While it will be apparent that the inventions herein described are well calculated to achieve the benefits and advantages set forth above, it will be appreciated that the inventions are susceptible to modification, variation and change without departing from the spirit thereof. Improvements to the operation of an acid gas removal process using a controlled freezing zone are provided. The improvements provide a design for the removal of $H_2S$ down to very low levels in the product gas.

What is claimed is:

1. A system for removing acid gases from a raw gas stream, comprising:
   a dehydration vessel for receiving the raw gas stream, and separating the raw gas stream into a dehydrated raw gas stream and a stream comprised of an aqueous fluid;
   a heat exchanger for cooling the dehydrated gas stream, and releasing a cooled sour gas stream;
   a cryogenic distillation tower that receives the cooled sour gas stream, and separates the cooled sour gas stream into (i) an overhead gas stream comprised primarily of methane, and (ii) a bottom liquefied acid gas stream comprised primarily of carbon dioxide, wherein the cryogenic distillation tower separates the cooled sour gas stream by freezing the carbon dioxide in the cooled sour gas stream;
   a final co-current contactor configured to (i) receive the bottom liquefied acid gas stream, (ii) receive a partially methane-enriched gas stream from a previous co-current contactor, (iii) release a final methane-enriched gas stream to the cryogenic distillation tower, and (iv) release a first partially-stripped acid gas liquid to the previous co-current contactor; and
   a first co-current contactor configured to (i) receive a stripping gas, (ii) receive a second partially-stripped acid gas liquid from a second co-current contactor, (iii) release a final stripped acid gas liquid, and (iv) release a first partially-methane-enriched gas stream to the second co-current contactor; and
   wherein the co-current contactors are arranged in series and wherein the stripping gas comprises carbon dioxide; and
   wherein the at least one of the co-current contactors comprise a mixing device and a coalescing device.

2. The system of claim 1, wherein the final stripped acid gas liquid comprises about 98 mol. percent or more acid gas.

3. The system of claim 2, wherein a substantial portion of the final stripped acid gas liquid is injected into a subsurface formation through one or more acid gas injection wells.

4. The system of claim 2, wherein a portion of the final stripped acid gas liquid is diverted and used as at least a portion of the stripping gas via reboiling.

5. The system of claim 1, wherein:
   the cryogenic distillation tower comprises a freezing zone;
   the freezing zone receives the cooled sour gas stream, a cold liquid spray comprised primarily of methane, and the further comprises methane from the final methane-enriched gas stream from the final co-current contacting device; and
   the cryogenic distillation tower further comprises refrigeration equipment downstream of the cryogenic distillation tower for cooling the overhead methane stream and returning a portion of the overhead methane stream to the cryogenic distillation tower as the cold liquid spray.

6. The system of claim 5, further comprising:
   a melt tray below the freezing zone for receiving a cold slurry of acid gas particles, and delivering a substantially solids-free slurry to the final co-current contacting device as the bottom liquefied acid gas stream.

7. The system of claim 6, wherein the bottom liquefied acid gas stream exits the cryogenic distillation tower at a temperature no greater than about −70° F.

8. The system of claim 5, further comprising:
   a lower distillation zone below the freezing zone for receiving a cold slurry of acid gas particles, at least partially melting the slurry of acid gas particles into a liquid stream, and delivering the liquid stream to the final concurrent contacting device as the bottom liquefied acid gas stream.

9. The system of claim 5, further comprising:
   an upper distillation zone above the freezing zone for receiving vapor from the freezing zone and releasing the overhead gas stream.

10. The system of claim 2, wherein the system comprises only two co-current contactors for processing the bottom acid gas stream such that:
    the final co-current contactor is the second co-current contactor;
    the previous co-current contactor is the first co-current contactor;
    the first partially-methane-enriched gas stream released by
    the first co-current contactor is the partially methane-enriched gas stream received by the final co-current contactor; and
    the first partially-stripped acid gas liquid released by the final co-current contactor is the second partially-stripped acid gas liquid received by the first co-current contactor.

11. The system of claim 2, wherein the system comprises three co-current contactors for processing the bottom acid gas stream, such that:
    the previous co-current contactor is the second co-current contactor; and
    the second co-current contactor is configured to (i) receive the first partially-methane-enriched gas stream from the first co-current contactor, (ii) receive the first partially-stripped acid gas liquid from the final co-current contactor, (iii) release a second partially-methane-enriched gas stream into the final co-current contactor, and (iv) release the second partially-stripped acid gas liquid into the first co-current contactor.

12. The system of claim 2, wherein the system comprises at least three co-current contactor for processing the bottom liquefied acid gas stream, such that:
    the final co-current contactor, any intermediate co-contactors, the second co-current contactor and the first co-current contactor are arranged to deliver respective stripped acid gas liquids as progressively CO2-richer acid gas liquids in series, and
    the first co-current contactor, the second co-current contactor, any intermediate co-contactors, and the final co-current contactor are arranged to deliver the respective methane-enriched gas streams as progressively methane-enriched gas streams in series.

13. The system of claim 1, wherein the mixing device is selected from a static mixer, an eductor, and a centrifugal mixer.

14. A system for removing acid gases from a raw gas stream, comprising:
- a dehydration vessel for receiving the raw gas stream, and separating the raw gas stream into a dehydrated raw gas stream and a stream comprised of an aqueous fluid;
- a heat exchanger for cooling the dehydrated raw gas stream, and releasing a cooled sour gas stream;
- a cryogenic distillation tower that receives the cooled sour gas stream, and separates the cooled sour gas stream into (i) an overhead gas stream comprised primarily of methane, and (ii) a bottom acid gas stream comprised primarily of carbon dioxide, wherein the cryogenic distillation tower separates the cooled sour gas stream by freezing the carbon dioxide in the cooled sour gas stream;
- a final lower co-current contactor configured to (i) receive the bottom liquefied acid gas stream, (ii) receive a partially-methane-enriched gas stream from a previous lower co-current contactor, (iii) release a final methane-enriched gas stream into the cryogenic distillation tower, and (iv) release a first partially-stripped acid gas liquid into the previous lower co-current contactor; and
- a first lower co-current contactor configured to (i) receive a stripping gas, (ii) receive a second stripped acid gas liquid from a second lower co-current contactor, (iii) release a final stripped acid gas liquid, and (iv) release a first partially-methane-enriched gas stream to the second lower co-current contactor;
- a first upper co-current contactor configured to (i) receive the overhead gas stream, (ii) receive a second partially-$CO_2$-enriched reflux liquid from a second co-current contactor, (iii) release a first partially-sweetened methane gas stream to the second co-current contactor, and (iv) release a final $CO_2$-enriched reflux liquid to the cryogenic distillation tower; and
- a final upper co-current contactor configured to (i) receive a reflux liquid, (ii) receive a next-to-last partially-sweetened methane gas stream from a next-to-last co-current contactor, (iii) release a first partially-$CO_2$-enriched reflux liquid to the next-to-last co-current contactor, and (iv) release a final sweetened methane gas stream; and
- wherein the lower co-current contactors are arranged in series and wherein the stripping gas comprises carbon dioxide; and
- wherein the at least one of the lower co-current contactors comprise a mixing device and a coalescing device.

15. The system of claim 14, wherein the bottom liquefied acid gas stream exits the cryogenic distillation tower at a temperature no greater than about −70° F.

16. The system of claim 14, wherein the cryogenic distillation tower comprises a freezing zone that receives (i) the cooled sour gas stream, (ii) a cold liquid spray comprised primarily of methane, and (iii) the final methane-enriched gas stream from the final lower co-current contacting device.

17. The system of claim 14, wherein the mixing device is selected from a static mixer, an eductor, and a centrifugal mixer.

18. The system of claim 14, wherein the final sweetened methane gas stream comprises about 99 mol. percent or more methane.

19. The system of claim 18, wherein a substantial portion of the final sweetened methane gas stream is delivered for liquefaction and sale.

20. The system of claim 18, wherein a portion of the final sweetened methane gas stream is diverted and used as at least a portion of the reflux liquid during operation.

21. The system of claim 14, further comprising:
- a melt tray below the freezing zone for receiving a cold slurry of acid gas particles.

22. The system of claim 14, further comprising:
- an upper distillation zone above the freezing zone for receiving vapor from the freezing zone and releasing the overhead gas stream.

23. The system of claim 18, wherein the system comprises only two co-current contactors for processing the overhead acid gas stream such that:
- the final co-current contactor is the second co-current contactor;
- the next-to-last co-current contactor is the first co-current contactor;
- the first partially-sweetened methane gas stream released by the first co-current contactor is the partially sweetened methane gas stream received by the final co-current contactor; and
- the second partially-$CO_2$-enriched reflux liquid received by the first co-current contactor is the partially-$CO_2$-enriched reflux liquid released by the final co-current contactor.

24. The system of claim 18, wherein the system comprises three co-current contactors for processing the overhead gas stream, such that:
- the next-to-last co-current contactor is the second co-current contactor; and
- the second co-current contactor is configured to (i) receive the first partially-sweetened methane gas stream from the first co-current contactor, (ii) receive the first partially-$CO_2$-enriched reflux liquid from the final co-current contactor, (iii) release a second partially-sweetened methane gas stream to the final co-current contactor, and (iv) release the second partially-$CO_2$-enriched reflux liquid to the first co-current contactor.

25. The system of claim 18, wherein the system comprises at least three co-current contactor for processing the overhead gas stream, such that:
- the final co-current contactor, any intermediate co-contactors, the second co-current contactor and the first co-current contactor are arranged to deliver respective $CO_2$-enriched reflux liquids as progressively $CO_2$-richer reflux liquids in series; and
- the first co-current contactor, the second co-current contactor, any intermediate co-contactors, and the final co-current contactor are arranged to deliver the respective sweetened gas streams as progressively sweetened gas streams in series.

26. The system of claim 14, wherein the overhead gas stream comprises not only methane, but also helium, nitrogen, or combinations thereof.

* * * * *